United States Patent
Hunzinger

(10) Patent No.: US 8,699,967 B2
(45) Date of Patent: Apr. 15, 2014

(54) UPLINK TRANSMIT DIVERSITY ENHANCEMENT

(75) Inventor: Jason Frank Hunzinger, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 12/870,632

(22) Filed: Aug. 27, 2010

(65) Prior Publication Data

US 2011/0053527 A1    Mar. 3, 2011

Related U.S. Application Data

(60) Provisional application No. 61/238,482, filed on Aug. 31, 2009.

(51) Int. Cl.
  *H03C 7/02*    (2006.01)
(52) U.S. Cl.
  USPC ........... 455/101; 455/102; 455/103; 455/132; 455/133; 455/140; 455/166.2; 375/299; 375/347
(58) Field of Classification Search
  None
  See application file for complete search history.

(56) References Cited

U.S. PATENT DOCUMENTS

| | | | |
|---|---|---|---|
| 6,684,086 B2 * | 1/2004 | Miya | 455/562.1 |
| 7,515,373 B1 * | 4/2009 | Supino | 360/77.04 |
| 7,656,815 B2 * | 2/2010 | Kellerer et al. | 370/252 |
| 7,701,919 B2 * | 4/2010 | Ah Lee | 370/344 |
| 8,279,770 B2 * | 10/2012 | Hunzinger | 370/252 |
| 2007/0258537 A1 * | 11/2007 | Mailaender | 375/267 |
| 2008/0109694 A1 * | 5/2008 | Jen | 714/748 |
| 2009/0068956 A1 * | 3/2009 | Naito et al. | 455/67.11 |
| 2009/0238246 A1 * | 9/2009 | Dawid et al. | 375/148 |
| 2010/0041408 A1 * | 2/2010 | Caire et al. | 455/446 |
| 2010/0080187 A1 * | 4/2010 | Papasakellariou et al. | 370/329 |

FOREIGN PATENT DOCUMENTS

WO    WO 2006126921 A1 *  11/2006

* cited by examiner

*Primary Examiner* — Fayyaz Alam
*Assistant Examiner* — Mohammed Rachedine
(74) *Attorney, Agent, or Firm* — Darren M. Simon

(57) ABSTRACT

A method for uplink transmit diversity enhancement is disclosed. A subset of two or more potential uplink transmission configurations are determined. A subset of potential uplink transmission configurations is evaluated. An uplink transmission configuration is selected based on the evaluation. Metrics of the selected uplink transmission configuration are determined. The selected uplink transmission configuration is applied for an extended use period.

35 Claims, 16 Drawing Sheets

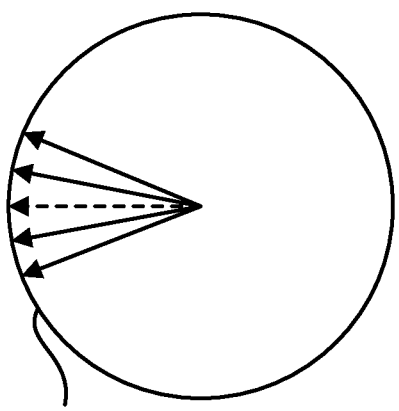
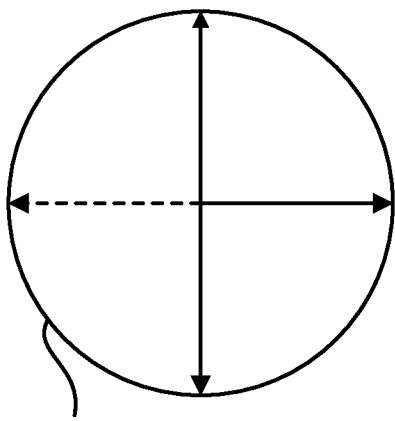
FIG. 11

UPLINK TRANSMIT DIVERSITY ENHANCEMENT

RELATED APPLICATIONS

This application is related to and claims priority from U.S. Provisional Patent Application Ser. No. 61/238,482 filed Aug. 31, 2009, for "Uplink Transmit Diversity Enhancement."

TECHNICAL FIELD

The present disclosure relates generally to communication systems. More specifically, the present disclosure relates to systems and methods for uplink transmit diversity enhancement.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

Wireless communication systems are widely deployed to provide various types of communication content such as voice, video, data and so on. These systems may be multiple-access systems capable of supporting simultaneous communication of multiple terminals with one or more base stations.

In the wireless communication network, data may be transmitted between the mobile station and the base station. The mobile device may use various configurations for transmitting data to the base station. Depending on channel conditions, one configuration may provide optimal transmission parameters. Therefore, benefits may be realized by improving the selection of these various configurations for transmitting data to the base station.

SUMMARY

A method for uplink transmit diversity in a wireless communication device is disclosed. A subset of two or more potential uplink transmission configurations are determined. A subset of potential uplink transmission configurations is evaluated. An uplink transmission configuration is selected based on the evaluation. Metrics of the selected uplink transmission configuration are determined. The selected uplink transmission configuration is applied for an extended use period.

The evaluating may be done relative to another uplink transmission configuration. The subset selecting may include selecting an uplink transmission configuration if a corresponding consistency metric satisfies a threshold. The consistency metric may be an auto-correlation of a metric of the uplink transmission configuration. The metric of the uplink transmission configuration is a normalized relative metric that is based on a comparison of a mean transmit power corresponding to the uplink transmission configuration and a mean transmit power for all uplink transmission configurations tested in an evaluation period. The auto-correlation may be determined using an Infinite Impulse Response (IIR) filter. The consistency metric may be based on uplink transmission configuration cross-correlations. The consistency metric may be based on a best phase derivative. The threshold may be selected to optimize a tradeoff between a cost of evaluation and a benefit of extended use.

In one configuration, the subset selecting is based on an age condition. The subset selecting may include selecting uplink transmission configurations that are older than an age threshold. The age threshold may be determined based on a tradeoff point between a cost of evaluation of a larger subset of uplink transmission configurations and a benefit of detecting a better uplink transmission configuration not in a subset of uplink transmission configurations selected based on a correlated metric. The tradeoff point may be based on a duty cycle and the duty cycle may be an evaluation period duration divided by a total cycle duration or an evaluation period duration divided by an extended use period. The age threshold may be the number of slots since a corresponding uplink transmission configuration was tested. Alternatively, the age threshold may be a number of cycles. The subset selecting may further include limiting the subset to a maximum number of uplink transmission configurations with a high consistency.

A wireless device configured for uplink transmit diversity is also disclosed. The wireless device includes a processor and memory in electronic communication with the processor. Executable instructions are stored in the memory. The instructions are executable to select a subset of potential uplink transmission configurations from a set of uplink transmission configurations based on a consistency condition. The instructions are also executable to evaluate each potential uplink transmission configuration. The instructions are also executable to select an uplink transmission configuration based on the evaluation. The instructions are also executable to apply the selected uplink transmission configuration for an extended use period.

A wireless device configured for uplink transmit diversity is also disclosed. The wireless device includes means for selecting a subset of potential uplink transmission configurations from a set of uplink transmission configurations based on a consistency condition. The wireless device also includes means for evaluating each potential uplink transmission configuration. The wireless device also includes means for selecting an uplink transmission configuration based on the evaluation. The wireless device also includes means for applying the selected uplink transmission configuration for an extended use period.

A computer-program product for uplink transmit diversity is also disclosed. The computer-program product comprises a computer-readable medium having instructions thereon. The instructions include code for selecting a subset of potential uplink transmission configurations from a set of uplink transmission configurations based on a consistency condition. The instructions also include code for evaluating each potential uplink transmission configuration. The instructions also include code for selecting an uplink transmission configuration based on the evaluation. The instructions also include code for applying the selected uplink transmission configuration for an extended use period.

A method for uplink transmit diversity in a wireless communication device is also disclosed. The method includes determining when to evaluate uplink transmission configurations as a super-position of two or more sequences of cycles. A selection of uplink transmission configurations to evaluate are determined from a set of uplink transmission configurations for each sequence. Each uplink transmission configuration in the selection is evaluated. An uplink transmission configuration is selected for extended use. The selected uplink transmission configuration is applied for an extended use period.

In one configuration, each cycle in each sequence may include an evaluation period and an extended use period. The super-position of two or more sequences of cycles may be determined by evaluating each uplink transmission configuration in the selection at a scheduled time. The evaluating of each uplink transmission configuration may be done relative to another uplink transmission configuration. The super-position of two or more sequences may be determined by combining uplink transmission configuration evaluations. Uplink transmission configuration evaluations may be combined when they would occur at a same time, overlapping times or within a predetermined time of one another. The combining of uplink transmission configuration evaluations may include evaluating a union of uplink transmission configuration subsets of each sequence or evaluating a concatenation of uplink transmission configuration subsets of each sequence.

A phase resolution of uplink transmission configurations to be evaluated may be determined based on a rate of change of phase determined from one or more other cycles. The phase resolution may be selected such that the rate of change of phase is a multiple of the phase resolution. The rate of change of phase may be determined as a phase derivative. Alternatively, the rate of change of phase may be determined from a phase difference that has a high cross-correlation. A parameter of one sequence may be adapted based on a parameter of another sequence. The parameter of another sequence may be selected from the group consisting of a duty cycle, phase resolution, window size, window center, uplink transmission configuration testing period, evaluation duration, extended use period, total cycle duration, number of uplink transmission configurations and whether antenna magnitude combinations are included in the selection for only a single sequence, and one or more uplink transmission configuration subsets. The uplink transmission configuration testing period of one sequence may be shorter than the uplink transmission configuration testing period of another sequence. The cycles of the one sequence may be longer than the cycles of the another sequence.

The set of uplink transmission configurations for a first sequence may include higher resolution phase uplink transmission configurations than the set of uplink transmission configurations for a second sequence. The set of uplink transmission configurations for a second sequence may include uplink transmission configurations for different antenna magnitudes than the set of transmission configurations for a first sequence. The set of uplink transmission configurations for a first sequence may not be evaluated if a best uplink transmission configuration resulting from evaluation of a second sequence is an antenna magnitude difference uplink transmission configuration rather than a phase difference uplink transmission configuration. Parameters of metrics may be stored.

A wireless device configured for uplink transmit diversity is also disclosed. The wireless device includes a processor and memory in electronic communication with the processor. Executable instructions are stored in the memory. The instructions are executable to determine when to evaluate uplink transmission configurations as a super-position of two or more sequences of cycles. The instructions are also executable to determine a selection of uplink transmission configurations to evaluate from a set of uplink transmission configurations for each sequence. The instructions are also executable to evaluate each uplink transmission configuration in the selection. The instructions are also executable to select an uplink transmission configuration for extended use. The instructions are also executable to apply the selected uplink transmission configuration for an extended use period.

A wireless device configured for uplink transmit diversity is also disclosed. The wireless device includes means for determining when to evaluate uplink transmission configurations as a super-position of two or more sequences of cycles. The wireless device also includes means for determining a selection of uplink transmission configurations to evaluate from a set of uplink transmission configurations for each sequence. The wireless device also includes means for evaluating each uplink transmission configuration in the selection. The wireless device also includes means for selecting an uplink transmission configuration for extended use. The wireless device also includes means for applying the selected uplink transmission configuration for an extended use period.

A computer-program product for uplink transmit diversity is also disclosed. The computer-program product comprises a computer-readable medium having instructions thereon. The instructions include code for determining when to evaluate uplink transmission configurations as a super-position of two or more sequences of cycles. The instructions also include code for determining a selection of uplink transmission configurations to evaluate from a set of uplink transmission configurations for each sequence. The instructions also include code for evaluating each uplink transmission configuration in the selection. The instructions also include code for selecting an uplink transmission configuration for extended use. The instructions also include code for applying the selected uplink transmission configuration for an extended use period.

BRIEF DESCRIPTION OF THE DRAWINGS

FIG. 11 is a block diagram illustrating relative phase offsets on a unit circle;

DETAILED DESCRIPTION

Figure 1:
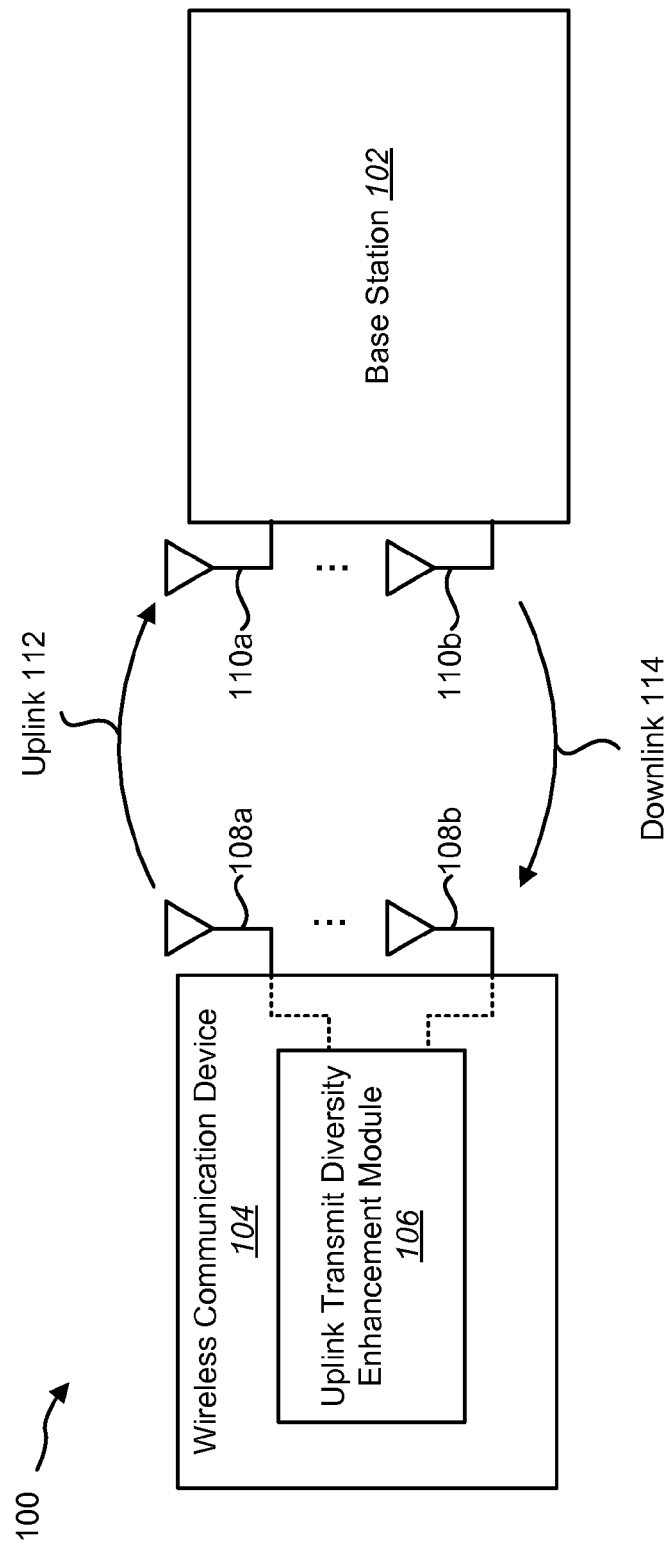
FIG. 1 is a block diagram illustrating a wireless communication system with multiple wireless devices.

FIG. 1 is a block diagram illustrating a wireless communication system 100 with multiple wireless devices. A wireless device may be a base station 102, a mobile device, a controller or the like. A base station 102 is a station that communicates with one or more wireless communication devices 104. A base station 102 may also be referred to as, and may include some or all of the functionality of, an access point, a broadcast transmitter, a Node B, an evolved Node B, etc. Each base station 102 provides communication coverage for a particular geographic area. A base station 102 may provide communication coverage for one or more wireless communication devices 104. The term "cell" can refer to a base station 102 and/or its coverage area depending on the context in which the term is used.

A wireless communication device 104 may also be referred to as, and may include some or all of the functionality of, a terminal, an access terminal, a user equipment (UE), a mobile station (MS), a subscriber unit, a station, etc. A wireless communication device 104 may be a cellular phone, a personal digital assistant (PDA), a wireless device, a wireless modem, a handheld device, a laptop computer, etc. A wireless communication device 104 may communicate with zero, one, or multiple base stations 102 on the downlink 114 and/or uplink 112 at any given moment. The downlink 114 (or forward link) refers to the communication link from a base station 102 to a wireless communication device 104, and the uplink 112 (or reverse link) refers to the communication link from a wireless communication device 104 to a base station 102.

Communication between a wireless communication device 104 in a wireless system (e.g., a multiple-access system) and a base station 102 may be achieved through transmissions over a wireless link comprised of a forward link and a reverse link. Such a communication link may be established via a single-input single-output (SISO), multiple-input single-output (MISO), or a multiple-input multiple-output (MIMO) system. A MIMO system includes transmitter(s) and receiver(s) equipped, respectively, with multiple transmit antennas and multiple receive antennas for data transmission. The MIMO system may provide improved performance (e.g., higher throughput, greater capacity or improved reliability) if the additional dimensionalities created by the multiple transmit and receive antennas are utilized.

The wireless communication system 100 may utilize MIMO. At the transmitter, each portion of a data stream may be transmitted from a different antenna 108a-b. At the receiver, the different portions of the data stream may be received by different antennas 110a-b and then combined.

The wireless communication system 100 may utilize transmit diversity. In transmit diversity, signals originating from multiple independent sources that have been modulated with identical information-bearing signals are transmitted. In transmit diversity, the transmission characteristics of the signals may vary. Significant performance gains may be achieved by using longer cycles and thus lower duty cycle when an uplink transmission configuration has longer-term advantages. This may avoid the disadvantage of uplink transmission configuration testing. Shorter cycles may be used when rapid uplink transmission configuration selection reflects channel dynamics. Thus, the best uplink transmission configuration or at least an acceptable uplink transmission configuration may be used.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems and spatial division multiple access (SDMA) systems.

The wireless communication device 104 may communicate with a base station 102 using uplink transmit diversity enhancement. In uplink transmit diversity enhancement, potential uplink transmission configurations may be tested periodically to determine an optimal uplink transmission configuration. The potential uplink transmission configuration with the best or at least acceptable merits (i.e., with the best or at least acceptable metrics) may be selected as the optimal uplink transmission configuration. Uplink transmit diversity enhancement is discussed in further detail below.

In closed loop uplink transmit diversity enhancement, the base station 102 may determine transmit diversity modifications for the wireless communication device 104. The base station 102 may then send the transmit diversity modifications to the wireless communication device 104. In open loop uplink transmit diversity enhancement, the wireless communication device 104 may autonomously make decisions concerning transmit diversity. However, the base station 102 may send feedback information to the wireless communication device 104, which may directly or indirectly indicate a measure of uplink transmit diversity performance. One disadvantage of open loop uplink transmit diversity is that feedback induced by testing uplink transmission configurations may be indirect and/or delayed. Furthermore, open loop uplink transmit diversity may have limited feedback/information (errors, imprecision).

One advantage of open loop uplink transmit diversity is that no additional uplink pilot overhead may be needed. Furthermore, no additional downlink feedback overhead may be needed. Also, no additional synchronization may be used between the wireless communication device 104 and the base station 102. Open loop uplink transmit diversity is also not limited by protocol restraints (e.g., phase resolution, timing, etc.).

The present systems and methods may be used in the context of open loop uplink transmit diversity or closed loop uplink transmit diversity. The wireless communication device 104 may include an uplink transmit diversity enhancement module 106. The uplink transmit diversity enhancement module 106 may generate uplink transmissions. The uplink transmissions may be transmitted by the wireless communication device 104 via one or more antennas 108a-b. Each antenna 108a-b may be controlled by the uplink transmit diversity enhancement module 106. The uplink transmissions may be received by the base station 102 via one or more antennas 110a-b.

Figure 2:
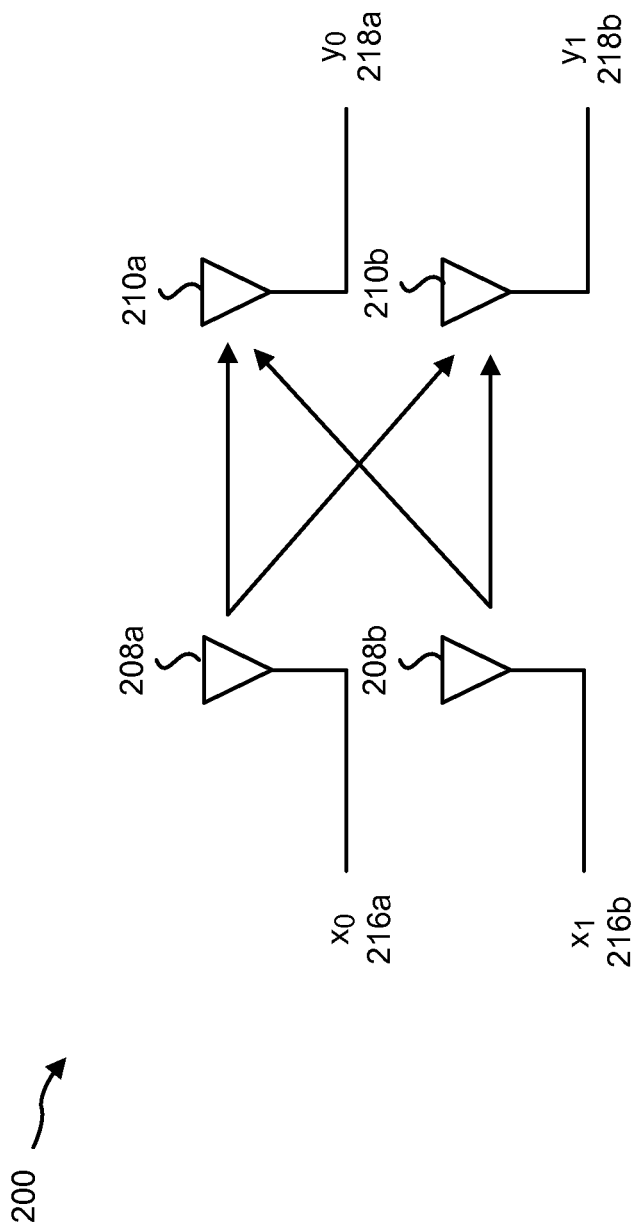
FIG. 2 is a block diagram illustrating a multiple-input multiple-output (MIMO) system with multiple antennas.

FIG. 2 is a block diagram illustrating a multiple-input multiple-output (MIMO) system 200 with multiple antennas 208a-b, 210-b. A first signal $x_0$ 216a and a second signal $x_1$ 216b may be transmitted using antennas 208a and 208b, respectively. Signals $x_0$ 216a and $x_1$ 216b may be the same signal. Multiple antennas 210a-b may receive the transmitted signals. For example, a first receiving antenna 210a may receive the first transmitted signal and the second transmitted signal. The received signals may be denoted $y_0$ 218a and $y_1$ 218b.

Mobile Transmit Diversity (MTD), also known as Uplink Transmit Diversity (UL-TD), is increasingly deployed in wireless communication systems 100. Mobile Transmit Diversity may achieve significant mobile transmit power reduction and capacity increases using beamforming, diversity and/or channel and antenna imbalances. These schemes may control the phase or magnitude of the signal transmitted on multiple antennas at the wireless communication device 104. Such control may be based on direct or indirect feedback from a base station 102 or other performance metrics. Determining an improved phase or magnitude may use feedback delay and/or testing time (either at the base station 102 or wireless communication device 104). However, if the wireless communication device 104 is not stationary, the improved phases or magnitudes may have changed by the time the feedback or test is completed. And, in general, the more uplink transmission configurations there are to test, the longer it may take. Furthermore, the channel conditions may be changing during the decision process.

The present systems and methods include an enhanced method of UL-TD that may be capable of performance gain at both low and high wireless communication device 104 speeds and may have higher resolution in determining the optimal phase or magnitude. This may be achieved by selecting and evaluating a subset of possible uplink transmission configurations at any given time using a super-position of sequences or a combination of uplink transmission configuration selection conditions. This may have a direct advantage of faster evaluation and an indirect advantage of lessening the chance of selecting a poor uplink transmission configuration. The end-user and system advantages may include higher uplink (UL) 112 capacity, lower wireless communication device 104 transmit power (or longer battery life), shorter delays, and higher throughput.

One goal of Uplink Transmit Diversity (UL-TD) may be to improve the receive signal quality or, equivalently, reduce the transmit power used to achieve the same receive signal quality by controlling the phase and/or magnitude of the signal at one or more transmit antennas 208*a-b*. However, the transmit power may be divided amongst the one or more transmit antennas 208*a-b*. Therefore, if the control of the phase and/or magnitude is non-optimal, a UL-TD system may actually perform worse than without UL-TD (e.g., assigning half of the power to a significantly weaker antenna or selecting a phase or amplitude that causes the signals to destructively combine).

However, if the phase and/or magnitudes can be controlled in a way that makes the signals transmitted from the one or more antennas combine constructively through beamforming, through diversity or by identifying imbalances either in the antennas themselves (whether due to differences between antenna gains or patterns) or the channel for each antenna, then there may be potential for substantial gain. For example, suppose there is no magnitude imbalance between paths from two transmit antennas 208*a-b*. If equal power $$G_1 = G_2 = \frac{G}{2}$$

is used (½ per antenna) and the receive phase between the two were optimally corrected for using UL-TD, the UL-TD gain may be $G' = (\sqrt{G_1} + \sqrt{G_2})^2 = 2G$ (i.e., a 3 dB gain).

However, to achieve such a gain, the optimal phase and/or magnitude may need to be determined. Moreover, the optimal phase and/or magnitude may be constantly changing due to wireless communication device 104 motion, system loading, interference or channel variations. In fact, if the wireless communication device 104 is not stationary, the optimal phases or magnitudes may change by the time the feedback or test is complete. Furthermore, the channel conditions may even be changing during the decision process itself.

The time over which wireless channel conditions remain relatively comparable may be related to temporal correlation of each channel (how the signal paths from one antenna change over time) and the spatial correlation between channel paths (how signal paths from multiple antennas are interrelated). The temporal correlation may be related to the maximum Doppler frequency (Doppler effect) due to relative motion between the transmitter (e.g., wireless communication device 104) and receiver (e.g., base station 102). The Doppler frequency is given by $$\Delta f = \left|\frac{\Delta v}{c}\right| f_c,$$

where $f_c$ is the radio (carrier) frequency (e.g., 2 GHz), $|\Delta v|$ is the magnitude of the velocity of the transmitter relative to the receiver and c is the speed of light.

The relation of the channel condition temporal correlation may be modeled according to Clarke's model of the 50% coherence time $$T_c = \frac{1}{\Delta f}\sqrt{\frac{9}{16\pi}}.$$

Thus, for example, for a cellular communication channel operating in a 2 GHz band, the 50% channel coherence time at a pedestrian speed of 3 km/hr may only be about 76 ms (i.e., 3 km/hr directly away or toward the receiving base station 102). In other words, a determination of the best phase or magnitude to use may need to take much less than 76 ms to track the channel conditions and may only be valid for the remainder of that 76 ms time (or approximately on that order of time).

With regard to spatial correlation, consider a multiple-input multiple-output (MIMO) channel, in which the same signal is transmitted from each antenna, $\vec{y} = H\vec{x} + \vec{n}$, where the complex receive signal vector $\vec{y}$ is a function of noise $\vec{n}$ for each receive antenna and the effect of the channel on the complex transmitted signal vector $\vec{x}$ is expressed by the multiplication of the channel matrix H, having complex elements $h_{j,k}$ corresponding to each transmit and receive antenna combination. Each $h_{j,k}$ may be expressed as $h_{j,k} = |h_{j,k}|e^{j\theta_{j,k}}$. If the signals transmitted from multiple transmit antennas 208 are indistinguishable at a given receive antenna 210*a* because the same signal is transmitted from each transmit antenna, then the complex channel coefficients may interfere or reinforce one another. This can be shown mathematically for the above example as shown in Equation (1) (omitting the noise term for clarity):

$$y_k = h_{0,k}x_0 + h_{1,k}x_1 = (h_{0,k} + h_{1,k})x \quad (1)$$

However, not only the channel coefficient magnitudes may cause interference. Even if the magnitudes are the same, for example $|h_{0,k}| = |h_{1,k}| = 1$, then $y_k = (h_{0,k} + h_{1,k})x = (e^{j\theta_{0,k}} + e^{j\theta_{1,k}})x$. The received signal can thus be expressed as shown in Equation (2):

$$y_k = e^{j\theta_{0,k}}(1 + e^{j\Delta\theta_k})x \quad (2)$$

where $\Delta\theta_k = \theta_{1,k} - \theta_{0,k}$. For example, if $\Delta\theta = \pi$ (radians), then the channels are mutually destructive and $y_k = 0$. In contrast, if $\Delta\theta = 0$ (radians), then the channels are constructive and $y_k = e^{j\theta_{0,k}}x$.

Figure 3:
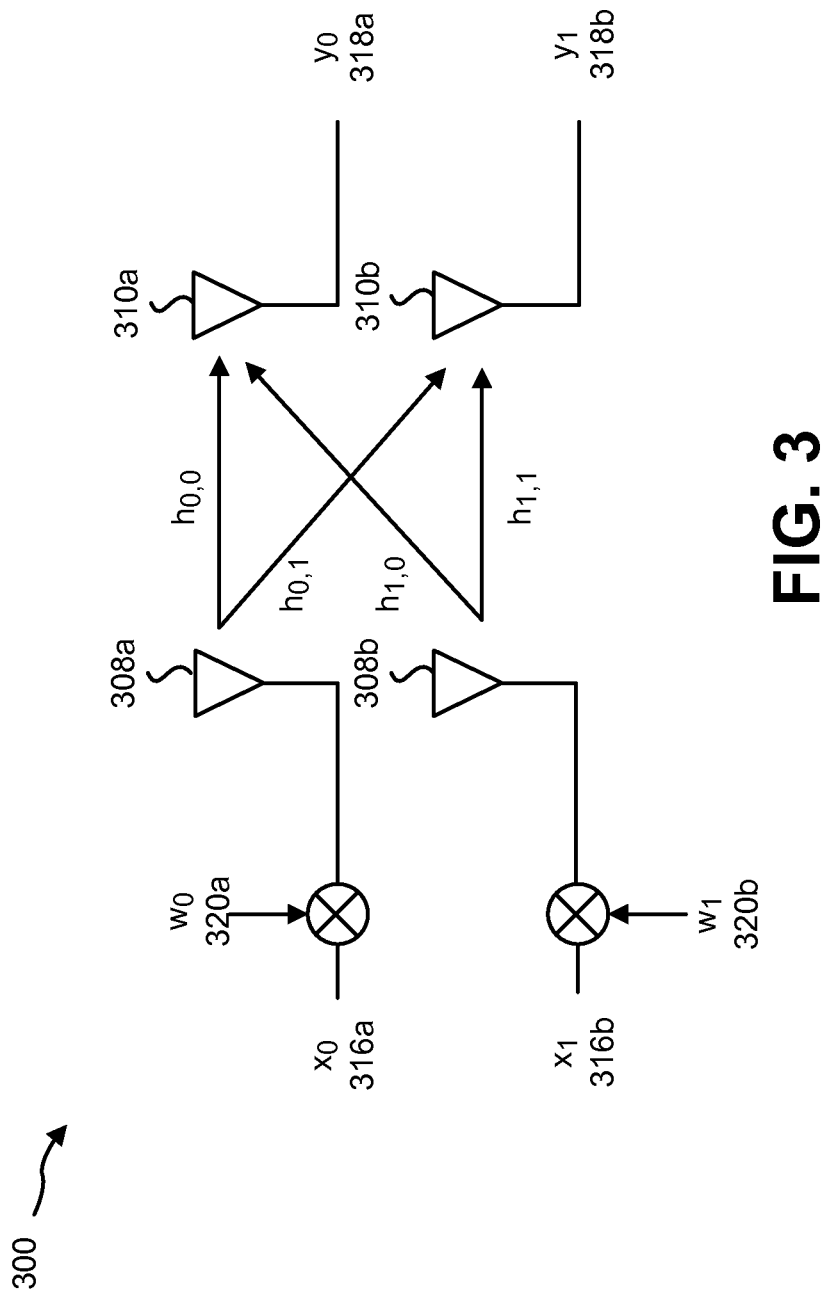
FIG. 3 is a block diagram illustrating beamforming with multiple antenna.

FIG. 3 is a block diagram illustrating a beamforming system 300 with multiple antennas 308a-b, 310a-b. The beamforming may correspond to an uplink transmission configuration. A first weight $w_0$ 320a may be applied to a first signal $x_0$ 316a to be transmitted and a second weight $x_1$ 320b may be applied to a second signal $x_1$ 316b to be transmitted. The first signal $x_0$ 316a and the second signal $x_1$ 316b may be the same signal. Each weight 320a-b may adjust the phase and signal strength of the signals 316a-b to be transmitted. The first signal $x_0$ 316a may then be transmitted using a first antenna 308a and the second signal $x_1$ 316b may be transmitted using a second antenna 308b. Multiple antennas 310a-b may receive the transmitted signals. For example, a first receiving antenna 310a may receive the first transmitted signal and the second transmitted signal.

Some MTD schemes may attempt to influence the relative receive phase or magnitude by controlling the phase or magnitude of the transmitted signal per antenna so that the received signals are constructive rather than destructive. This may be accomplished by a weighting scheme such as illustrated in FIG. 3. By applying a weight or weights 320a-b (relative phase or magnitude) across transmit antennas 308a-b, the combination of the channel coefficients and weights at the receive antenna(s) 310a-b may be controlled. The received signals may thus be denoted $y_0$ 318a and $y_1$ 318b. Mathematically, for the same underlying transmit signal, $y_k = (h_{0,k}w_0 + h_{1,k}w_1)x + n_k$. Each weight may be expressed as shown in Equation (3):

$$|w_0|e^{j[\phi_0]} \qquad (3)$$

Above, each weight is expressed in terms of a magnitude $|w_i|$ and phase $\phi_i$. The channel components may also be expressed in terms of their magnitude $|h_{i,k}|$ and phase component $\theta_i$.

Thus, the $k^{th}$ received signal may be given as shown in Equation (4):

$$y_k = (|h_{0,k}|w_0|e^{j[\theta_{0,k}+\phi_0]} + |h_{1,k}|w_1|e^{j[\theta_{1,k}+\phi_1]})x + n_k \qquad (4)$$

This may be expressed as shown in Equation (5):

$$y_k = c(1 + a_k e^{j[\Delta\theta_k + \Delta\phi]})x + w_k \qquad (5)$$

where $$a_k = \frac{|h_{1,k}||w_1|}{|h_{0,k}||w_0|},$$

$c = |h_{0,k}||w_0|e^{j[\theta_{0,k}+\phi_0]}$ and $\Delta\phi = \phi_1 + \phi_0$. Since $\Delta\phi$ may be controllable, it may be theoretically possible to set $\Delta\phi = -\Delta\theta_k$. Furthermore, since $a_k$ may be controllable via $$\frac{|w_1|}{|w_0|},$$

it may be theoretically possible to set $a_k = 1$. If both are accomplished, then the channels are fully constructive and $y_k = 2cx + w_k$. The challenge may be to control the weights to achieve either this phase or magnitude alignment or both. This, effectively, may use matching the weights to the channels, which may be constantly varying as described above.

In a multiple-input multiple-output (MIMO) system, the individual channels from each transmit antenna 308a-b to receive antenna 310a-b may be modeled as independent channels or as a spatial channel with scatterers, thus introducing correlation between the paths from and to different antennas. While such spatial correlation may be exploitable in static conditions, in dynamic conditions each of the paths is subject to the Doppler Effect just as in the single antenna case above, and thus each may have a limited coherence time even if correlated with one another.

Furthermore, the determination process may be impacted by noise, fast and slow fading (shadowing), blocking and other channel impairments. Such problems may not only impact the channel's correlation over time, but may also impact feedback that may be used for determination.

Figure 4:
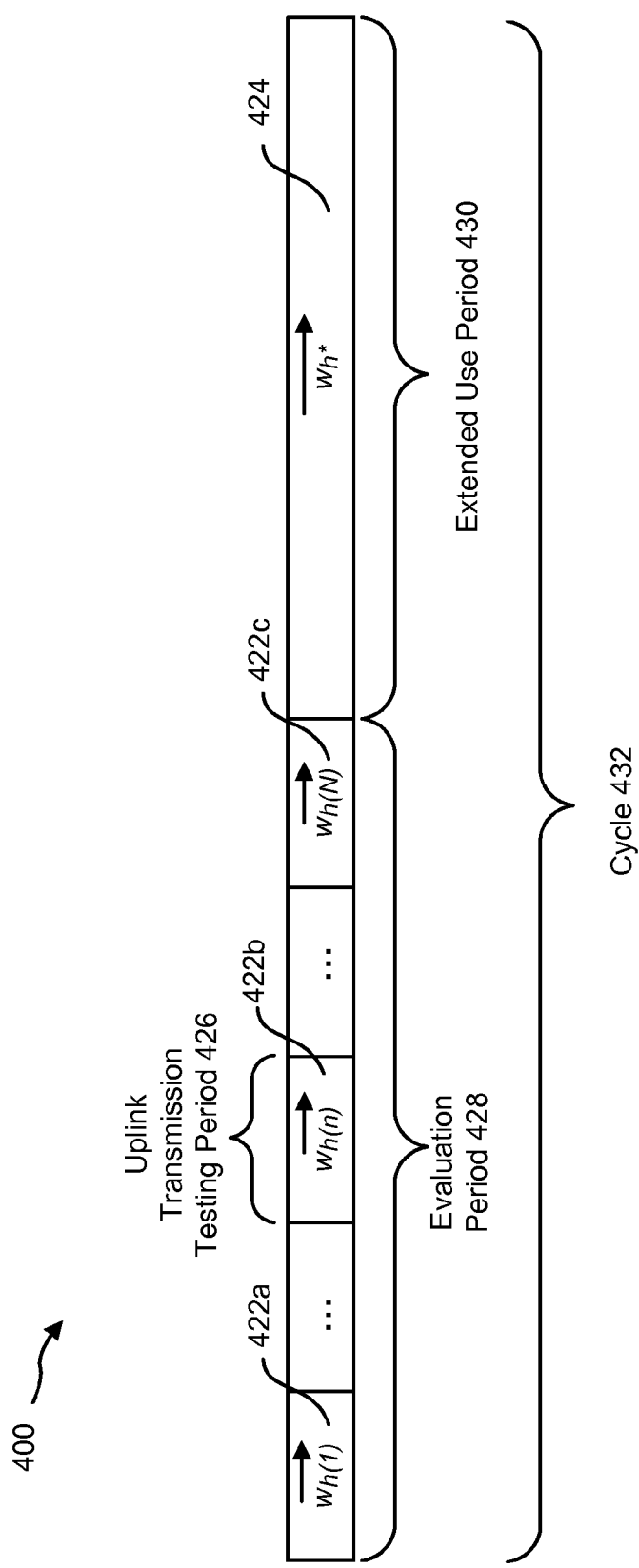
FIG. 4 is a block diagram illustrating a cycle of transmit diversity uplink enhancement.

FIG. 4 is a block diagram illustrating a cycle 400 of transmit diversity uplink enhancement. The uplink transmit diversity method may use one or more sequences of cycles 432. In each cycle 432, an uplink transmission configuration may be selected from a set or subset of potential uplink transmission configurations by testing the potential uplink transmission configurations during an evaluation period 428. A potential uplink transmission configuration may be tested for an uplink transmission configuration testing period 426. Each uplink transmission configuration may apply beamforming weights 422a-c to two or more antennas 108 used by the wireless communication device 104. The wireless communication device 104 may apply a beamforming weight 424 during an extended use period 430.

A typical MTD scheme may use a repeating process of evaluation wherein a number N of potential uplink transmission configurations (also sometimes called hypotheses) are tested to determine a selected uplink transmission configuration h* that may be used for an extended use period 430, until the start of the evaluation period for the next cycle. Here, h(n) (a potential uplink transmission configuration) should not be confused with $h_{j,k}$ (a channel coefficient).

Figure 5:
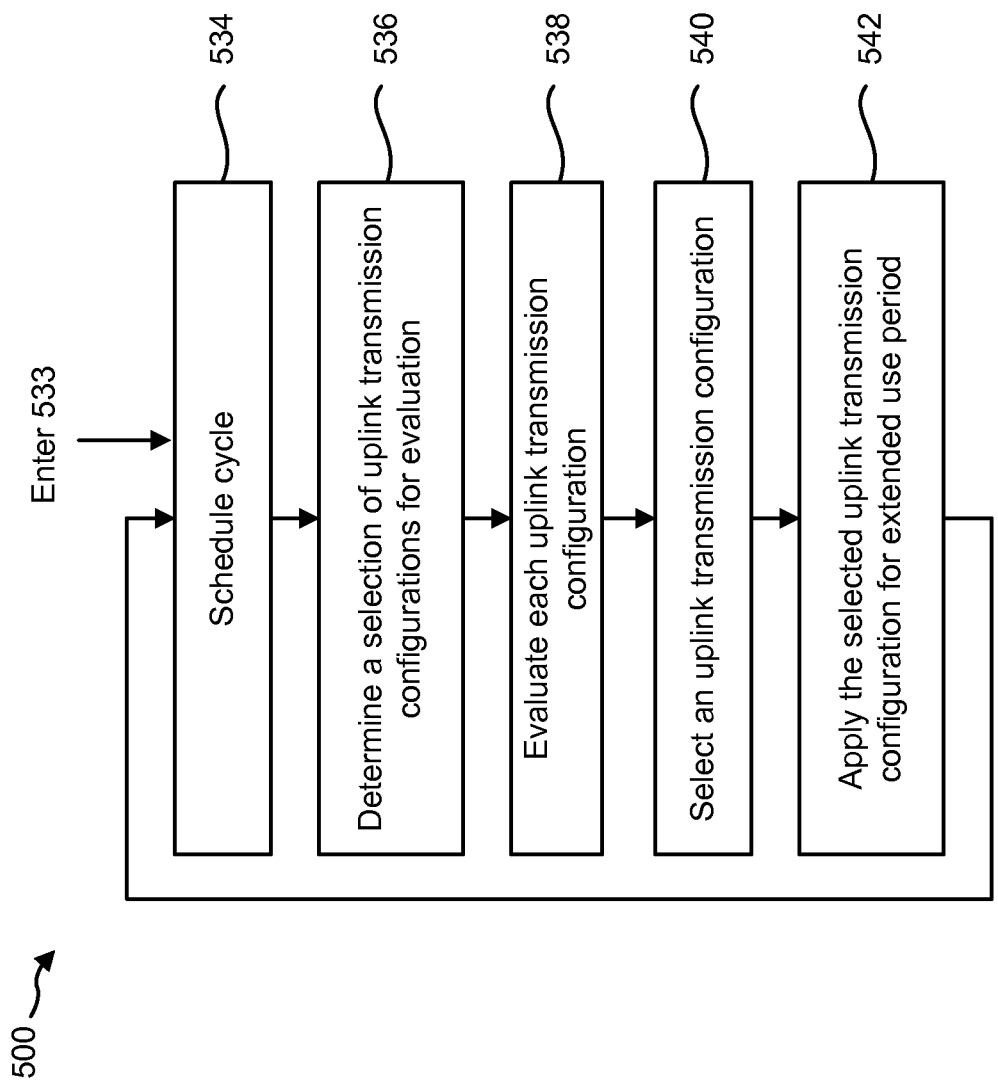
FIG. 5 is a flow diagram illustrating a method for uplink transmit diversity enhancement.

FIG. 5 is a flow diagram illustrating a method 500 for uplink transmit diversity enhancement. The method 500 may be applied only when the wireless communication device 104 is transmitting or only when feedback is available, or selectively when UL-TD is desired. For example, if the method 500 is implemented at the wireless communication device 104, the wireless communication device 104 may evaluate uplink transmission configurations using feedback from a base station 102. In this case, the wireless communication device 104 may be implemented in a manner such that the method 500 is only applied when the feedback is being received. For example, if the feedback is in the form of power-control commands, then the wireless communication device 104 may evaluate uplink transmission configurations when power-control commands are transmitted. Alternatively, the wireless communication device 104 may only evaluate uplink transmission configurations when power-control commands are received. For example, power control commands may not be received during sleep, idle or other power saving slots or power control command erasures may occur if the wireless communication device 104 is unable to reliably decode the feedback. If the method 500 is implemented at the base station 102 (or other infrastructure device), the base station 102 may apply the uplink transmission configuration evaluation when the wireless communication device is in an active state (transmitting or preparing or prepared to transmit) and may alternatively postpone evaluation until a connection is reliably established.

A wireless communication device 104 or a base station 102 may repeat cycles 432 to form a sequence, so an evaluation period may be entered 533 periodically as shown by FIG. 5. The cycle 432 may be initialized with a nominal extended use period 430 and/or with a default set of uplink transmission configurations for evaluation (such as all available uplink transmission configurations). The method 500 may start with a nominal extended use period 430 with a default uplink transmission configuration (such as a primary antenna only) and then enter 533 or it may immediately start with the evaluation. The wireless communication device 104 or base station 102 may schedule 534 a cycle 432 (i.e., determine when to evaluate 428 the potential uplink transmission configurations). The wireless communication device 104 or base station 102 may determine 536 a selection of uplink transmission configurations for evaluation. During the evaluation period 428 the system 100 may evaluate 538 a set of potential uplink transmission configurations by applying their phase or magnitude combinations in turn, testing each for a period 426. The system 100 may select 540 an uplink transmission configuration and apply 542 it for an extended use period 430. In the case of a wireless communication device 104 doing the evaluation 538, it may use power control bits or transmit power. In the case of a base station 102 doing the evaluation 538, the best uplink transmission configuration may be the one corresponding to the period that had the least (lowest) mean wireless communication device 104 transmit power. So an uplink transmission testing period 426 (uplink transmission configuration test time) may last a sufficient duration to get a useful (stable) mean wireless communication device 104 transmit power measurement. This may be on the order of 512 slots, for example. The duration may be considerable due to fluctuating channel conditions in the very short term and because the transmit power adjustment may be relatively coarse. For example, power control may be in steps of +1 or −1 dB. So, a precise measurement of mean wireless communication device 104 transmit power may take considerable time to be comparable over the entire evaluation period 428. The total cycle 432 duration depends on the number of potential uplink transmission configurations tested N, the uplink transmission configuration testing period $T_h$ 426, and the extended use period $T_u$ 430 as shown in Equation (6):

$$T=T_u+NT_h \quad (6)$$

However, the feedback controlling the wireless communication device 104 transmit power (UL) may be in the form of power control bits sent by the base station 102 to the wireless communication device 104. Such bits may be sent once per slot or slower (e.g., at 500 to 1500 Hz), and without error correction coding. In such a case, even assuming no errors, the maximum feedback rate might thus be 0.666 ms (1500 Hz). Consider the pedestrian 3 km/hr case above. Only about 114 power control bits may be received during 76 ms (the 50% coherence time). A method that uses 512 slots (~340 ms) just to determine the mean transmit power for a single uplink transmission configuration phase or magnitude combination may be unable to track such a channel's coherence time (76 ms). The evaluation period 428 may thus be almost five times the coherence time. In dynamic conditions, such a method may perform even worse than non-MTD due to the cost (in power) of testing uplink transmission configurations and making more erroneous determinations than a random unchanging (fixed) choice.

Thus, a method in which the entire period 428 or process of evaluation and use of a determined phase or magnitude combination is less than or equal to the channel coherence time $T \ll T_C$ may be desirable. Otherwise, the UL-TD may be unlikely to be able to keep up with channel variation and provide no gain or even worse performance than using a single antenna and no UL-TD.

In particular, the length of the evaluation time may generally depend on the number of uplink transmission configurations to be evaluated. Thus, the number of uplink transmission configurations may need to be reduced. Therefore, it may be therefore beneficial to determine which uplink transmission configurations should be omitted at a given time. That is, to obtain a fine phase resolution may use more uplink transmission configurations (a full 360 degree set includes four 90 degree offset phases, eight 45 degree offset phases, sixteen 22.5 degree offset phases, etc). Thus, without omitting uplink transmission configurations, the resolution may be limited by constraining evaluation time. In other words, a performance bound may not be overcome without some way of intelligently omitting some uplink transmission configurations. Moreover, multiple dimensions may be adapted. For example, phase resolution, cycle 432 duration, uplink transmission configuration testing period 426 and the number of uplink transmission configurations may be adapted.

The present systems and methods may select and examine a subset of the potential uplink transmission configurations at a given time. Thus, evaluation may be faster, waste less power on poorer potential uplink transmission configurations and reduce the chance of selecting a poor uplink transmission configuration. As a consequence, the UL-TD method may adapt to channel conditions faster so gains may be extended to higher speeds. Two general approaches may be used: uplink transmission configuration selection and multi-cycle super-position. These may be similar in effect under certain configurations but approach the problem in different ways.

The uplink transmission configuration selection method may comprise selecting a subset of possible uplink transmission configurations for any given evaluation period based on the past performance of those uplink transmission configurations. This method, for example, may base its selection on the consistency of a good uplink transmission configuration test in predicting good performance using that uplink transmission configuration (in a sense, the algorithm's performance). One example of such a consistency metric is the auto-correlation of an uplink transmission configuration's normalized relative metric (also sometimes denoted "merit"). This may be the auto-correlation (i.e., correlation over time) of the uplink transmission configuration's value relative to a reference uplink transmission configuration (such as an average value). For example, if an uplink transmission configuration's value is consistently good relative to an average or random uplink transmission configuration choice, it may be selected for evaluation (even if it is not the best). Conversely, if an uplink transmission configuration's value is inconsistent or consistently poor relative to an average or random uplink transmission configuration choice, it may be omitted (possibly, even if it is the current best). An age condition may also be used. In other words, an uplink transmission configuration is omitted only if it has not last been examined within a given time. This latter condition may be used to ensure stability. Moreover, with the selection method, a faster (shorter) nominal cycle may be used without performance degradation since the selection function reduces the evaluation cost and thus, better channel tracking performance may be achieved.

The multi-cycle super-position method may comprise assigning different subsets of uplink transmission configurations (e.g., absolute or relative phases or magnitudes) to different overlapping cycles. For example, a first cycle might operate at a slower rate and include all 90 degree phase offsets and a second cycle might operate at a faster rate and include a few 45 degree phase offsets in a window around the current leading uplink transmission configuration. The two cycles may be concurrent so if any is in an evaluation period, that cycle may control which possible uplink transmission configuration is applied during the evaluation and in the subsequent evaluation period. If the evaluation periods 428 of different sequences overlap, they may be merged (only one possible uplink transmission configuration may be applied at one time, but the set of possible uplink transmission configurations evaluated may be the union of the subsets for the cycle of each sequence).

These two approaches may, in some configurations, be similar in effect if the super-position of the multiple cycles turns out to be similar or the same as the uplink transmission configuration selection. In one example, the super-position may include two cycles: an alpha cycle with a fixed cycle duration and fixed evaluation period, and a beta cycle with an adaptive/variable cycle 432 duration and a variable evaluation period 428. The evaluation period 428 may be variable if, for example, possible uplink transmission configuration testing periods 426 are aborted early if they do not meet an early performance condition. The super-position may be the combination of the two. The uplink transmission configuration selection method may yield a similar result, but may be accomplished by directly selecting a subset of uplink transmission configurations at a given time. If the subset equates to the super-position, the two result in a similar effect. The cycle 432 may be variable or adapted, but does not necessarily have to be.

The methods described here may select a subset of possible uplink transmission configurations to be evaluated at any given time, but may approach this selection in different ways. However, the common objective may be to reduce the number of possible uplink transmission configurations evaluated so that less power may be wasted on testing poorer possible uplink transmission configurations, faster cycle rates may be achievable and the chance of choosing a poor uplink transmission configuration is reduced. The latter may be a result of excluding a possible uplink transmission configuration in an evaluation so that it is precluded from being chosen.

The uplink transmission configuration selection method is described first and, in some ways, may appear to be the less complex of the two. The multi-cycle super-position method is described thereafter. The explanation of this super-position method may provide insight into motivation behind the uplink transmission configuration selection design and why the uplink transmission configuration selection method works well.

Figure 6:
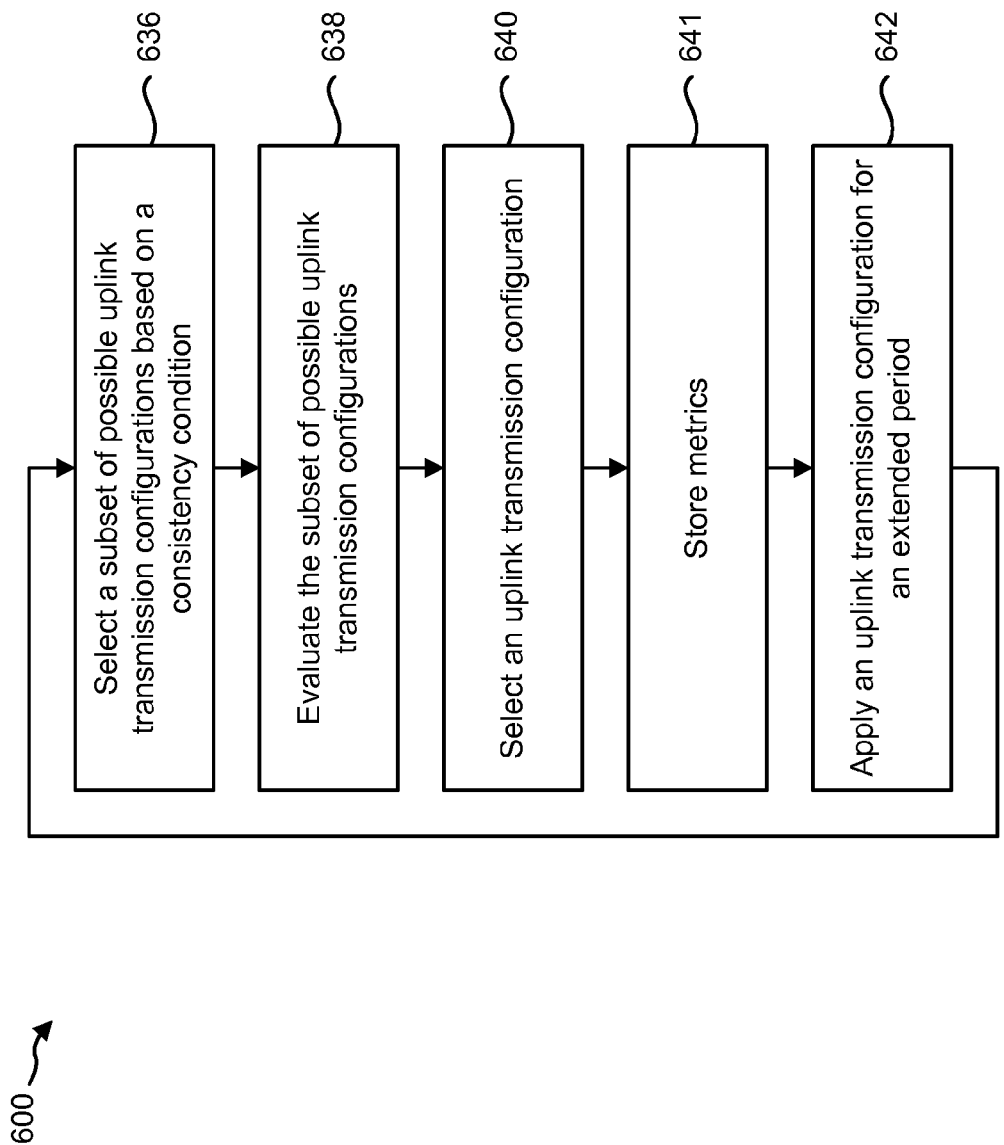
FIG. 6 is another flow diagram illustrating a method for uplink transmit diversity enhancement.

FIG. 6 is another flow diagram illustrating a method 600 for uplink transmit diversity enhancement. In particular, FIG. 6 illustrates an uplink transmission configuration selection method 600. A wireless communication device 104 or base station 102 may select 636 a subset of possible uplink transmission configurations based on a consistency condition. That is, a wireless communication device 104 or base station 102 may select 636 a subset of possible uplink transmission configurations for any given evaluation period 428 based on the past performance of those uplink transmission configurations. The selection 636 may be based on the consistency of an uplink transmission configuration test in predicting that uplink transmission configuration's good performance. Thus, any possible uplink transmission configuration that does not satisfy a consistency condition may be omitted. This may be expressed as shown in Equation (7):

$$r(h,c) \geq c_{selection} \quad (7)$$

where r is a consistency metric, h is the possible uplink transmission configuration under consideration, c is the current cycle index and $c_{selection}$ is a threshold. Setting the threshold $c_{selection}$ high may have the effect of being more selective of which possible uplink transmission configurations to examine and vice versa. One example of such a consistency metric is the auto-correlation of an uplink transmission configuration's metric as shown in Equation (8):

$$r(h, c) \equiv r_d(h, c, a) = \frac{1}{C} \sum_{j=c-C+1}^{c} m(h, j) m(h, j+a) \quad (8)$$

where C is the auto-correlation window, d refers to the duty cycle (i.e., evaluation time divided by total cycle duration), c is the current (last) cycle index, m(h, j) is uplink transmission configuration h's metric measured at cycle j and where a is the auto-correlation offset (e.g., typically a=1). The d parameter reflects that the indexing of the metrics in the auto-correlation may depend on the duty cycle if it is changing, i.e., m may depend on d. A consistency metric other than auto-correlation may be used. For example, uplink transmission configuration cross-correlations or a best phase derivative may be used. Even if auto-correlation is used, it may be computed in alternate ways. For example, an Infinite Impulse Response (IIR) filter may be used as illustrated in Equation (9):

$$r_d(h,c,a) = \mu(m(h,c)m(h,c-a)) + (1-\mu)r_d(h,c-1,a) \quad (9)$$

where μ is the filter coefficient, generally having a relation to filter time constant C (in cycles) as shown in Equation (10):

$$\mu = 1 - 2^{-\frac{k}{2C}} \quad (10)$$

where k=2 for base 2, 3 dB fall-off by time interval C. Preferably, a normalized relative metric may be used so that the value reflects the value of the uplink transmission configuration relative to another or a reference (such as the value of a random or average choice). Additionally, the metric may be clipped and normalized as illustrated in equations (11), (12), and (13):

$$m(h, j) \equiv m_d(h, j) = \frac{\Delta m_d(h, j)}{\Delta m_d(h^{*(j)}, j)} \quad (11)$$

where $h^{*(j)}$ is the best uplink transmission configuration at cycle j and $\Delta m_d(h, j)$ is uplink transmission configuration h's relative metric defined as shown in Equation (12):

$$\Delta m_d(h,j) = \min(0, \bar{y}_d(h,j) - \bar{y}_d^r(j)) \quad (12)$$

where $\bar{y}_d(h, j)$ is the raw uplink transmission configuration metric (e.g., the mean wireless communication device 104 transmit power during the application of the uplink transmission configuration weights or the integrated power control bits) and $\bar{y}_d^r(j)$ is the reference (e.g., the mean of the raw uplink transmission configuration metrics for all uplink transmission configurations tested in the evaluation period of cycle j), for example as shown in Equation (13):

$$\bar{y}_d^r(j) = \frac{1}{|Q(j)|} \sum_{h \in Q(j)} \bar{y}_d(h, j) \quad (13)$$

where Q is the subset of uplink transmission configurations tested in cycle j. Note that this may share computation with cycle adaptation based on auto-correlation of the normalized relative metric, so there may be minimal additional complexity for applying the uplink transmission configuration selection method.

Accordingly, the normalized relative metric of an uplink transmission configuration may be high (e.g., closer to 1) if it is a good uplink transmission configuration and low if it is below or equal to the reference (e.g., closer to 0). If a good uplink transmission configuration continues to be good, its normalized relative metric may continue to be high (e.g., closer to 1). Thus, the auto-correlation may be closer to 1. A poor or inconsistent uplink transmission configuration may have a low auto-correlation (e.g., closer to 0). Thus, the consistency metric defined here may be a good example of a metric that indicates the consistency of a good uplink transmission configuration test.

The consistency condition may thus give a new uplink transmission configuration subset Q(c) to be evaluated 638 as shown in Equation (14):

$$Q(c)=\{h|r_d(h,c-1,a) \ge c_{selection}, h \in H\} \quad (14)$$

where H is the set of possible uplink transmission configurations (which may generally be a subset of possible or supported uplink transmission configurations).

The system 100 may evaluate 638 a subset of uplink transmission configurations, select 640 an uplink transmission configuration and apply 642 it for an extended use period 430. The wireless communication device 104 may evaluate 638 the subset of uplink transmission configurations Q(c) using power control bits or transmit power. The wireless communication device 104 may select 640 the uplink transmission configuration in the subset Q(c) corresponding to lowest transmit power during the testing period 426. Alternatively, the wireless communication device 104 may select 640 the uplink transmission configuration in the subset Q(c) corresponding to a particular testing period 426 based on another feedback or measured parameter such as comparing power control bits integrated over respective test periods 426 or by considering a comparative feedback from an infrastructure device such as a base station 102. Alternatively, the base station 102 may evaluate 638 the uplink transmission configurations in subset Q(c). The base station 102 may then select 640 the uplink transmission configuration corresponding to the testing period 426 that had the lowest mean wireless communication device 104 transmit power or the best receive signal to noise ratio (or other comparative measure). Alternatively, the base station 102 may select 636 the subset Q(c) and communicate the subset to the wireless communication device 104 for evaluation 638 and either the base station 102 or wireless communication device 104 may select 640 the optimum uplink transmission configuration. If the base station 102 selects 636 the subset but the wireless communication device 104 selects 640 the optimum uplink transmission configuration, then the wireless communication device 104 may communicate the optimum uplink transmission configuration (or even the metrics) to the base station 102, which may use this to select 636 the subset for the next cycle 432. Otherwise, if the device performing the selection 636 and the device performing the evaluation 638 are one and the same (or collocated), the overhead of such communication may be omitted. The system 100 may also store 641 consistency metrics for use in later evaluation. The metrics stored 641 may be normalized relative metrics, raw uplink transmission configuration metrics, relative metrics, any suitable consistency metric and/or any other data useful in computing a consistency.

The system 100 may apply 642 the selected uplink transmission configuration for an extended use period 430. The system 100 may then return to select 636 a subset of uplink transmission configurations based on a consistency condition.

Figure 7:
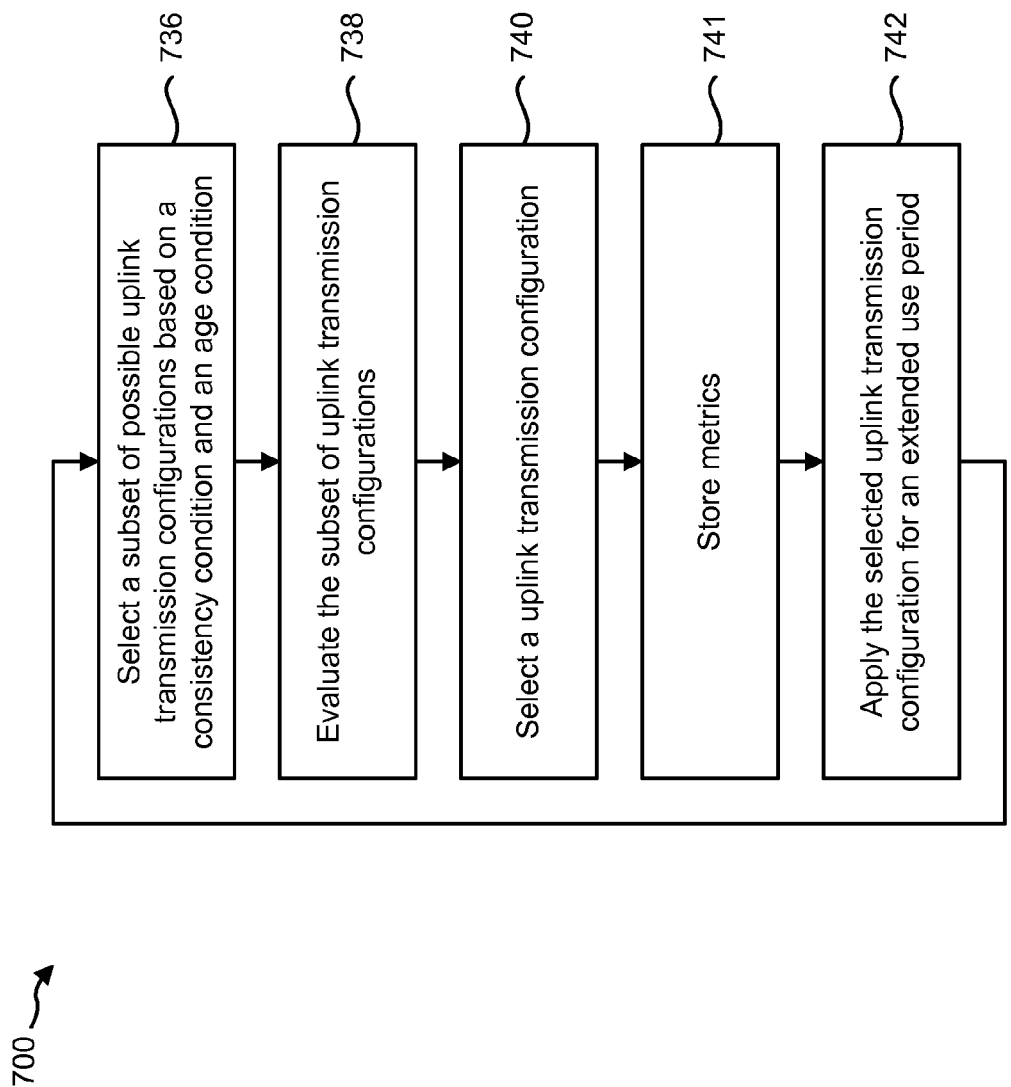
FIG. 7 is another flow diagram illustrating a method for uplink transmit diversity enhancement.

FIG. 7 is another flow diagram illustrating a method 700 for uplink transmit diversity enhancement. In particular, FIG. 7 illustrates another uplink transmission configuration selection method 700. A wireless communication device 104 or base station 102 may select 736 a subset of possible uplink transmission configurations based on a consistency condition and an age condition. That is, a wireless communication device 104 or base station 102 may select 736 a subset of possible uplink transmission configurations for any given evaluation period 428 based on the past performance of the uplink transmission configurations and the age of the possible uplink transmission configurations.

As discussed above, if a possible uplink transmission configuration does not satisfy the consistency condition, it may not be evaluated. This status may become stale after some time since the possible uplink transmission configuration is not being evaluated and thus the consistency metric (e.g., auto-correlation) may not be updated. This may also result in a tracking weakness wherein evaluation converges on a local minima or maxima (e.g., best uplink transmission configuration in a subset) rather than the best uplink transmission configuration overall (because some may be skipped). Therefore, an age condition may also be applied. Generally, an age condition may prevent omitting a possible uplink transmission configuration if it has not been evaluated in some predefined time or within some determined period. For example, one age condition may be as shown in Equation (15):

$$v(h) > v_{selection} \quad (15)$$

where v(h) is the age of the metric or measurement of uplink transmission configuration h and $v_{selection}$ is an age threshold. For example, age may be defined as the number of slots since the uplink transmission configuration was tested, the number of cycles 432, or any other suitable measure. The combined condition may thus be as shown in Equation (16):

$$Q(c)=\{h|r_d(h,c-1,a) \ge c_{selection} \lor v(h) > v_{selection}, h \in H\} \quad (16)$$

where the symbol ∨ is used to denote the logical OR operation (e.g., the uplink transmission configuration is selected for the subset if it is either consistently good or older than some age).

The system 100 may evaluate 738 a subset of uplink transmission configurations, select 740 an uplink transmission configuration and apply 742 it for an extended use period 430. The wireless communication device 104 may evaluate 738 the subset of uplink transmission configurations Q(c) using power control bits or transmit power. The wireless communication device 104 may select 740 the uplink transmission configuration in the subset Q(c) corresponding to lowest transmit power during the testing period 426. Alternatively, the wireless communication device 104 may select 740 the uplink transmission configuration in the subset Q(c) corresponding to a particular testing period 426 based on another feedback or measured parameter such as comparing power control bits integrated over respective test periods 426 or by considering a comparative feedback from an infrastructure device such as a base station 102. Alternatively, the base station 102 may evaluate 738 the uplink transmission configurations in subset Q(c). The base station 102 may then select 740 the uplink transmission configuration corresponding to the testing period 426 that had the lowest mean wireless communication device 104 transmit power or the best receive signal-to-noise ratio (or other comparative measure). Alternatively, the base station 102 may select 736 the subset Q(c) and communicate the subset to the wireless communication device 104 for evaluation 738 and either the base station 102 or wireless communication device 104 may select 740 the optimum uplink transmission configuration. If the base station 102 selects 736 the subset but the wireless communication device 104 selects 740 the optimum uplink transmission configuration, then the wireless communication device 104 may communicate the optimum uplink transmission configuration (or even the metrics) to the base station 102, which may use this to select 736 the subset for the next cycle 432. Otherwise, if the device performing the selection 736 and the device performing the evaluation 738 are one and the same (or collocated), the overhead of such communication may be omitted. The system 100 may also store 741 consistency metrics for use in later evaluation. The metrics stored 741 may be normalized relative metrics, raw uplink transmission configuration metrics, relative metrics, any suitable consistency metric, and/or any other data useful in computing a consistency or age of uplink transmission configurations.

The system 100 may apply 742 the selected uplink transmission configuration for an extended use period 430. The system 100 may then return to select 736 a subset of uplink transmission configurations based on a consistency condition and an age condition.

Figure 8:
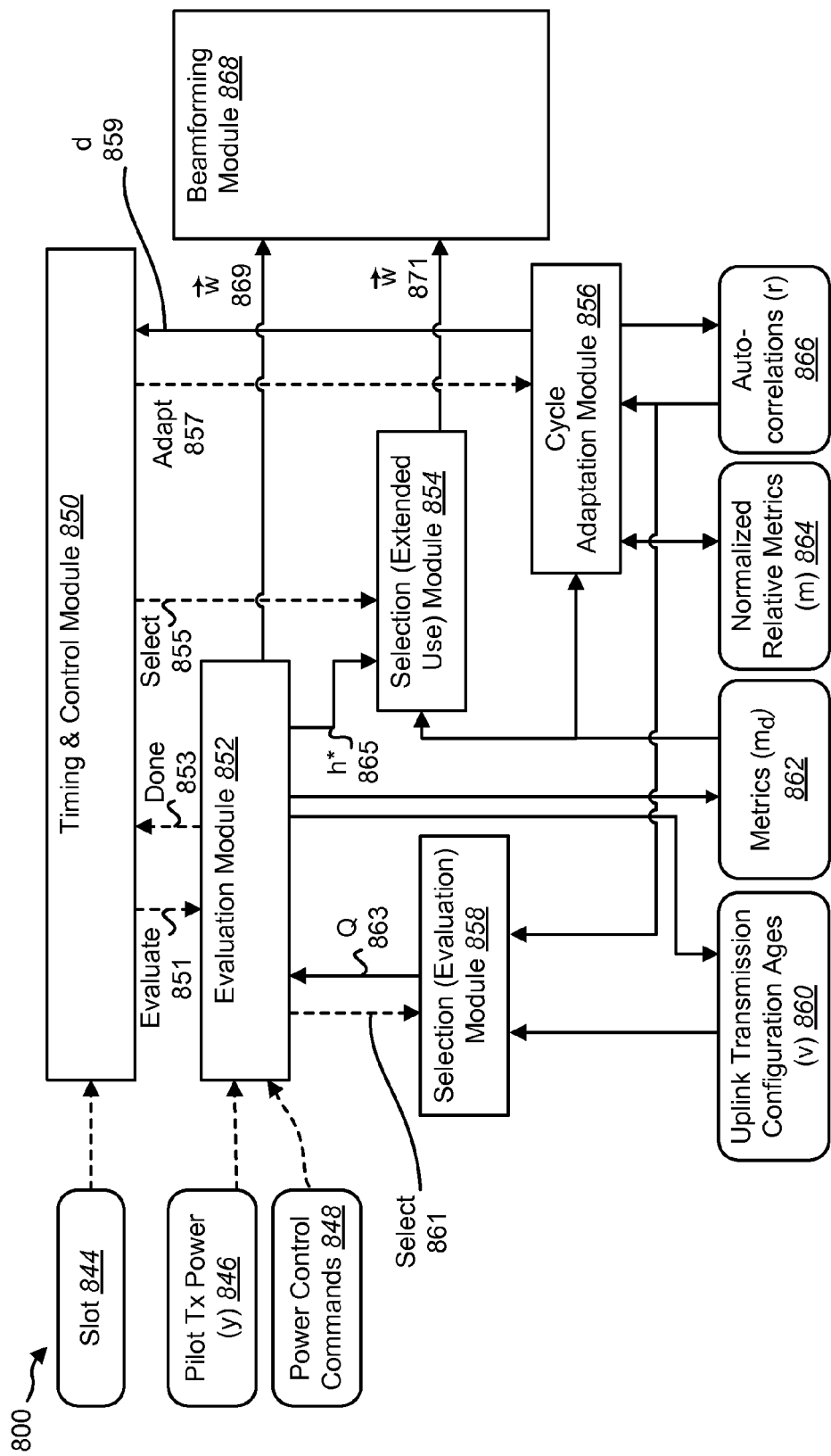
FIG. 8 is a block diagram illustrating data flows for uplink transmit diversity enhancement.

FIG. 8 is a block diagram illustrating data flows 800 for uplink transmit diversity enhancement. An evaluation module 852 may receive the pilot transmission power (y) 846 and/or power control commands 848. In response to an evaluation request 851 from a timing and control module 850, the evaluation module 852 may request 861 the selection of potential uplink transmission configurations from a selection (evaluation) module 858. The selection (evaluation) module 858 may provide two or more potential uplink transmission configurations Q 863 to the evaluation module 852, where Q 863 represents a subset of possible uplink transmission configurations.

The evaluation module 852 may then evaluate the two or more potential uplink transmission configurations. The evaluation module 852 may apply each potential uplink transmission configuration to a beamforming module 868. As discussed above, each uplink transmission configuration may include phase configurations and antenna configurations. The phase configurations and antenna configurations may be sent to the beamforming module as a collective weight $\vec{w}$ 869. The beamforming module 868 may then send uplink transmissions using the applied uplink transmission configurations. Metrics $m_d$ 862 of the evaluation may be stored. The evaluation module 852 may indicate to the timing and control module 850 when the evaluation is done 853.

The timing and control module 850 may send a select request 855 to a selection (extended use) module 854. The selection (extended use) 854 module may select an uplink transmission configuration 865 from the potential uplink transmission configurations. The selection (extended use) module 854 may base the selection on the stored metrics $m_d$ 862. The evaluation module 852 may provide the uplink transmission configuration h* 865 to the selection (extended use) module 854. Alternatively, the evaluation module 852 may provide only the metrics that the selection (extended use) module 854 may use to determine the uplink transmission configuration 865.

The selection (extended use) module 854 may apply the uplink transmission configuration to the beamforming module 868 using a weight $\vec{w}$ 871. The weight options may not necessarily include the magnitude differences between antennas. For example, the options may include a set of four 90 degree phase differences with equal magnitude and two antenna switching options. Alternatively, the options may include only antenna switching, phases or combinations of magnitude, phase and switching. The beamforming module 868 may then send uplink transmissions using the applied uplink transmission configuration.

The timing and control module 850 may send a request to a cycle adaptation module 856 to adapt 857 cycle adaptation parameters. The cycle adaptation module 856 may use the stored metrics $m_d$ 862 and calculated normalized relative metrics m 864 to obtain autocorrelations r 866 for each uplink transmission configuration over time. The cycle adaptation module 856 may then use the stored metrics $m_d$ 862, the calculated normalized relative metrics m 864, and the autocorrelations r 866 to determine an evaluation rate d 859. The cycle adaptation module 856 may send the evaluation rate d 859 to the timing and control module 850. The evaluation rate d 859 may then be used by the timing and control module 850 for future uplink transmission configuration enhancement for future slots 844.

The evaluation module 852 may store uplink transmission configuration ages v 860. A selection (evaluation) module 858 may use the combined consistency and age condition (see equation 16) to determine a subset of possible uplink transmission configurations. That is, the selection (evaluation) module 858 may use autocorrelations r 866 and uplink transmission configuration ages v 860 to select a subset of possible uplink transmission configurations. The selection (evaluation) module 858 is distinct from the selection (extended use) module 854, which may select which uplink transmission configuration to use 424 for an extended period 430. However, the auto-correlations r 866 may be used by both a cycle length adaptation module 856 and the uplink transmission configuration selection module 858. This method may be used regardless of what evaluation method is used to actually compare uplink transmission configurations (such as absolute or relative evaluation) or how they are compared (e.g., using power control bits 848, transmit power level 846, etc.).

The age threshold $v_{selection}$ and uplink transmission configuration selection threshold $c_{selection}$ may be selected heuristically, experimentally or be computed specifically to optimize a tradeoff of evaluation cost (higher power, etc.) and extended use benefits. This tradeoff exists here where there are two sequences of super-imposed cycles: a short-term (fast) cycle comprised of uplink transmission configurations meeting the selection threshold and a longer-term (slower) cycle comprised of uplink transmission configurations meeting the age threshold (i.e., a cycle having a period equal to, or on the order of, the age threshold). An optimal tradeoff may be achieved where a faster or slower cycle would result in a greater cost of evaluation (faster) or cost of using a non-optimal uplink transmission configuration for too long (slower) exceeds the benefit of better selection (faster) or less frequent evaluation (slower). An optimal equilibrium (tradeoff) point in terms of the target (optimal) auto-correlation for a duty cycle $d'=2^a d$ may be expressed as shown in Equation (17):

$$\hat{r}_{d'}(h) = c_a \tag{17}$$

where $$c_a = \frac{1 - 2^{2-a}d}{1 - 2^{1-a}d},$$

where d is a nominal or reference duty cycle (evaluation period 428 divided by total cycle 432 duration). Alternatively, the coefficient may be approximated as $c_a \cong 1 - 2^{1-a} d$. The dependence of $\hat{r}_{d'}$ and parameter d' on parameter a is omitted in Equation (17) for clarity. The actual evaluation period may vary so either the nominal or actual may be used. Alternatively, duty cycle d may also be defined as the evaluation period 428 divided by only the extended use period 430, or any similar or equivalent formulation to achieve the desired effect. Thus, the selection threshold may be set as shown in Equation (18):

$$c_{selection} = c_a \tag{18}$$

where $c_x$ may be computed using the duty cycle. If the nominal duty cycle of the sequence is fixed or assumed as the shortest allowed cycle, then a constant value may be used, since by setting a=0, $$c_0 = \frac{1-4d}{1-2d}.$$

Suppose the shortest nominal cycle (nominal assuming the number of uplink transmission configurations and uplink transmission configuration testing period 426 duration or evaluation period 428 as a whole does not change per cycle) is 19%. $c_0$=0.4 may then be used. Furthermore, the age threshold may be determined by reversing this process. That is, it may be determined by determining the effective cycle duration (age) that would yield an optimal duty cycle given the total number of uplink transmission configurations (maximum evaluation period 428) given longer-term auto-correlation (i.e., over the time corresponding to the age). For example, suppose there are a total of six uplink transmission configurations with a nominal testing period 426 of 10 slots. To tolerate an auto-correlation of about 0.9 (90%), the value of d would have to be about 0.05. Since the nominal evaluation period 428 would be 6*10 or 60 slots, the total cycle 432 would have to be on the order of 1000 slots. Thus, an age threshold may be set to 1000 slots. Alternatively, the age threshold may be selected according to a maximum time that may be tolerable. Other alternative formulations of an optimal threshold may be used to accomplish the same purpose of conditioning consistency.

A bound may be placed on the size of the subset. For example, the uplink transmission configuration subset for evaluation may be restricted to the most consistent N uplink transmission configurations.

Figure 9:
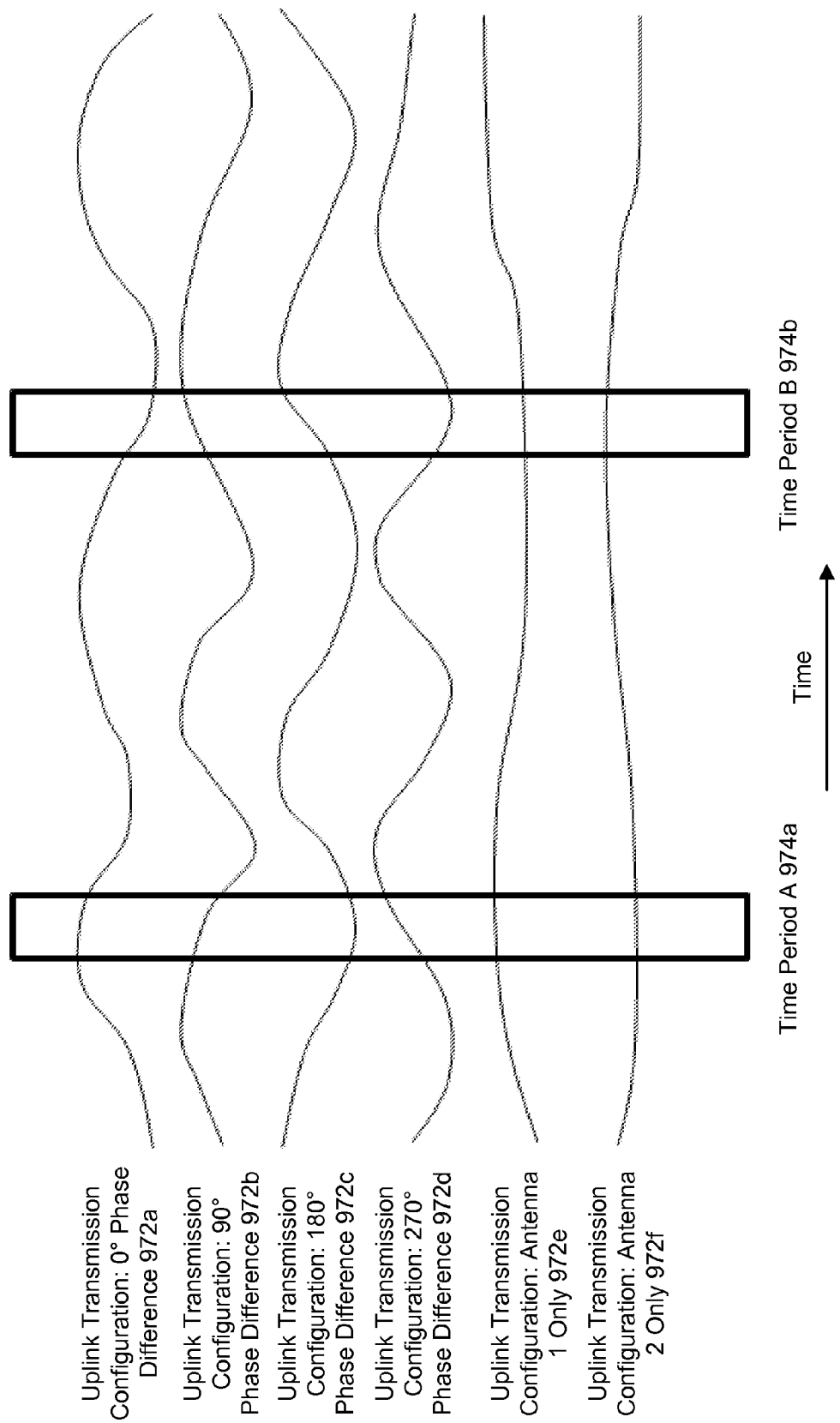
FIG. 9 is a waveform illustrating conceptualized consistency metrics for six possible uplink transmission configurations varying over time.

FIG. 9 is a waveform illustrating conceptualized consistency metrics for six possible uplink transmission configurations varying over time. Consider an example for purposes of explanation. Suppose the set of possible uplink transmission configurations includes four 90 degree phase offsets of equal magnitude per antenna 972a-d and two antenna switching options (all power to one antenna or the other) 972e-f for a total of 6 possible uplink transmission configurations 972a-f. Suppose the evaluation process is not perfect due to rapid channel variation, so a non-optimal uplink transmission configuration may be selected. Suppose the conceptualized consistency metric of each uplink transmission configuration varies as shown in FIG. 9.

Suppose also that the total time shown on the graph is much longer than the cycle 432 duration, so there are many evaluations over this time. The consistency of an uplink transmission configuration may increase if the evaluation of the uplink transmission configuration is good and if the uplink transmission configuration performs well over a longer period (i.e., during extended use 430). The consistency of any uplink transmission configuration may not be perfectly bad or perfectly good but varying somewhere in between for two reasons. First, because there may be errors in the evaluation process and channel variation. And second, because the metric of an uplink transmission configuration changes over time as it becomes good and then bad, good again and so on. In FIG. 9, it can be seen that in the case shown, the relative phase of the channel between the two transmit antennas is changing over time. During time period A 974a, a 0° phase difference 972a is best and this slowly changes to a 270° phase difference 972d, then to a 180° phase difference 972c, then to a 90° phase difference 972b and back to a 0° phase difference 972a, and so on for about two "cycles" until it reaches a 90° phase difference 972b again during time period B 974b. The consistency graphs reflect this negative relative phase rotation (counter-clockwise rotation) of the channel coefficients over time.

Instead of evaluating every uplink transmission configuration each evaluation period 428, the system 100 may select a subset based on consistency. Thus, during time period A 974a, the system 100 may select only uplink transmission configurations 972a, 972b, and 972d (perhaps 972e as well). These correspond to 0°, 90° and −90° (270°), or a window centered around 0° (the best phase). Since the best phase changes to −90° (270°) 972d near the end of time period A 974a, the evaluation process may detect this change. Time may be saved by skipping testing of uplink transmission configuration 972c (as well as 972f and perhaps 972e). Furthermore, as the best uplink transmission configuration changes, the consistencies change. For example, the consistency of the 0° phase difference 972a decreases because it is found to be the best uplink transmission configuration less often as the −90° phase difference 972d becomes dominant and is selected more often (thus increasing its consistency). As a result, the window generated by the uplink transmission configuration selection based on the consistency metric may track the optimal phase. An indirect benefit is that a poor uplink transmission configuration (e.g., 180° phase difference 972c during time period A 974a) may not even have the chance of being erroneously or mistakenly determined as the best because it is omitted from the evaluation.

The benefit of the age condition may also be illustrated in FIG. 9. Note that the antenna uplink transmission configurations 972e-f appear to have slower varying consistency than the phase uplink transmission configurations 972a-d. An antenna imbalance may cause this effect. Suppose uplink transmission configuration 972f (antenna 2 only) is not selected for evaluation for a long time because its consistency is continuously poor since time period A 974a. If it is not being evaluated, its more recent consistency cannot be determined and updated. However, by applying the age condition, the system triggers an evaluation of uplink transmission configuration 972f intermittently in order to update its consistency. Thus, its consistency may be updated by time period B 974b when its consistency has improved as shown in FIG. 9. In this case, it remains low for some time, but the imbalance eventually reverses before time period B 974b and thus may be detected. In effect, the consistency may be related to the frequency with which an uplink transmission configuration is tested although there may be a minimum frequency determined by the age threshold or condition. Another benefit to this approach is that unexpectedly good uplink transmission configurations may be detected over a longer term.

In the example above, it might be assumed that consistency could be used to determine where to center a window of phase uplink transmission configurations, similar to a tracking loop. While this may be one possible outcome, it is not the method or the most general goal. The assumption that the consistency threshold would be satisfied only by those phases adjacent to and including the optimal may be incorrect. That assumption may not even be likely. Even the optimal may not be consistent. With a multi-path environment (e.g., with multiple scatterers), phase difference may be a function of the channel coefficients of multiple sub-paths. Phase difference between antennas may be highly unlikely to vary in a constant rate of rotation conducive to tracking that might be seen with only a line of sight channel with a perfectly constant speed and direction for the wireless communication device 104.

The method 700 illustrated in FIG. 7 may apply any uplink transmission configuration that satisfies the consistency condition and/or age condition and may omit any that do not. The transmission configurations may not necessarily be adjacent phases or even from a common phase resolution set or even have phase differences. They may not have any relation, except that they may be consistently good (or relatively good compared to others). For example, the method 700 may select all phases, two adjacent phases (one may or may not be the previous optimal), two opposite phases, five adjacent phases and two non-adjacent, one or more non-adjacent phases, a phase and a magnitude option, only antenna switching options, combinations of these, etc., or none at all. When selecting no option, the method 700 skips evaluation, effectively and automatically turning off UL-TD when it may not provide a benefit. The selection may include the previously optimal uplink transmit configuration or not. Another case is when only the configuration that is currently in use is selected. In that case, the evaluation may also be skipped because there would be no comparison. This case is particularly relevant in antenna switching modes. For example, suppose there are only two configurations: use antenna 1 only or antenna 2 only. At first glance, hypothesis selection might not appear to have a benefit. However, actually, hypothesis selection may have a significant benefit because if one antenna is consistently good the evaluation cost may be reduced while at the same time, if the channel or imbalance is rapidly changing, a fast evaluation cycle may be used.

Returning to the beamforming/antenna switching combination example, in time period A 974*a*, only possible uplink transmission configurations 972*a*, 972*b* and 972*e* may be selected for evaluation. In time period B 974*b*, only uplink transmission configurations 972*b* and 972*f* may be selected for evaluation. In an upcoming hypothetical period X (not shown), perhaps only uplink transmission configurations 972*a* and 972*c* may satisfy the consistency condition. The advantages may become more substantial when the number of possible uplink transmission configurations increases or the likelihood of temporary dominance of a relatively small subset of the possible configurations is high. The latter was described in the paragraph above. With respect to the former, suppose, for example, that the maximum phase resolution is 10 degrees and five different magnitude combinations are possible (e.g., 1:0, 2/3:1/3, 1/2:1/2, 1/3:2/3, 0:1). The total number of possible uplink transmission configurations becomes 36*3+2=110. Uplink transmission configuration selection may choose any subset of those. The size of the subset may also be limited to the most consistent N uplink transmission configurations. For example, N may be set to four. Since the four best uplink transmission configurations may be any four of the 110 possibilities, the method 700 may choose any four of the 110 and they may have no relation or commonality (phase, magnitude, resolution, quadrant, etc.) whatsoever, except they may be consistently good uplink transmission configurations.

Figure 10:
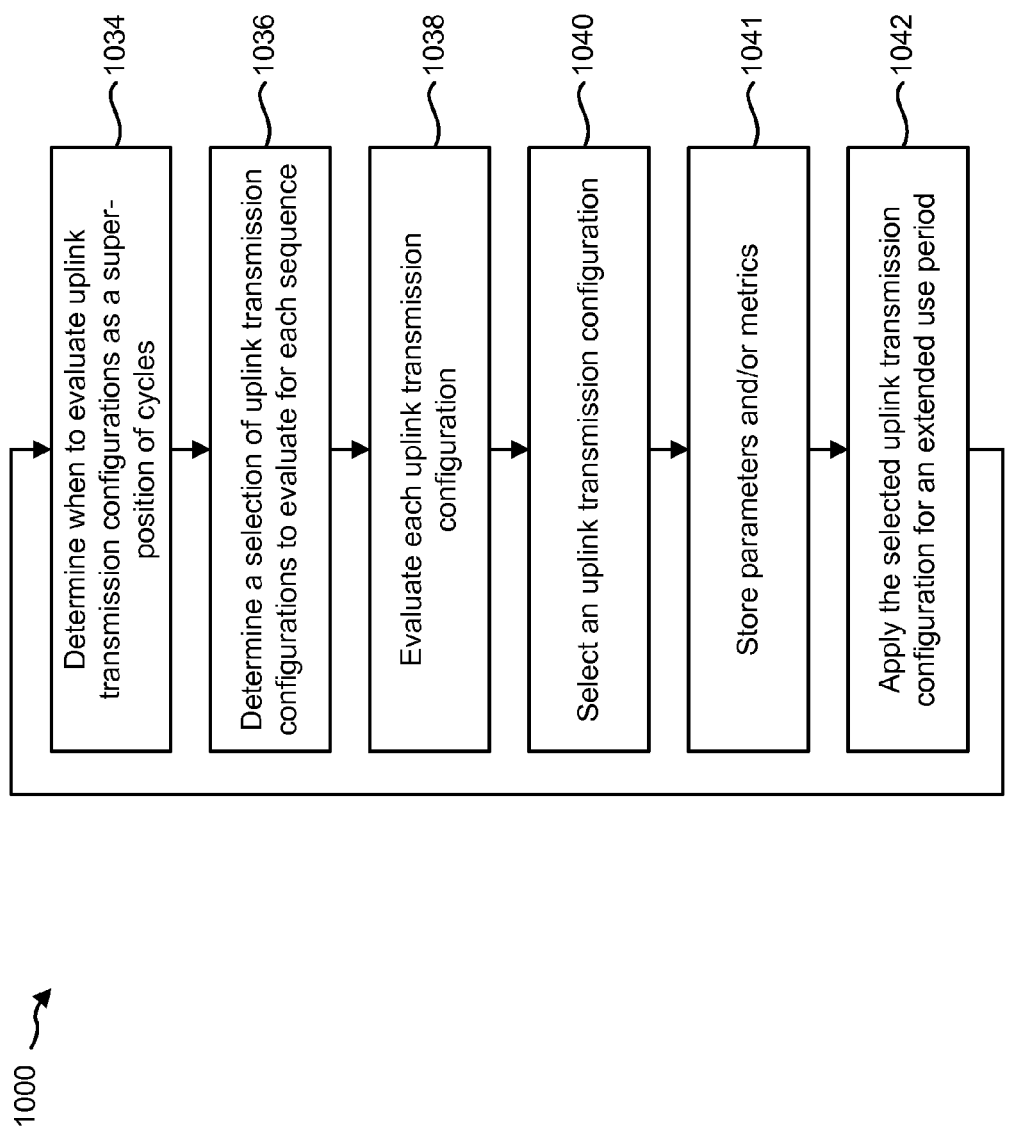
FIG. 10 is another flow diagram illustrating a method for uplink transmit diversity enhancement.

FIG. 10 is another flow diagram illustrating a method 1000 for uplink transmit diversity enhancement. This multi-cycle super-position method 1000 may comprise assigning different subsets of uplink transmission configurations (whether absolute or relative phases) to different overlapping sequences of cycles. For purposes of simplified explanation, the description here will focus on the super-position of two sequences of cycles even though this may be extended to three or more sequences of cycles by applying the same principles.

A cycle 432 may be an evaluation period 428 and an extended use period 430. A "sequence of cycles" in the context of multi-cycle super-position may refer to a sequence of cycles that is concurrent with another sequence or sequences. This is distinct from the cycle of a particular sequence of cycles. In other words, the description may refer to the $c^{th}$ cycle in the $e^{th}$ sequence of cycles. In this description, two concurrent sequences are referred to as alpha α and beta β sequences, although this method may be extended to any number of concurrent sequences.

The system 100 may determine 1034 when to evaluate uplink transmission configurations as a super-position of cycles. Sequences of cycles may be referred to as being concurrent because their nominal timing may be determined 1034 separately, although not necessarily independently. Timing may refer to the scheduling of evaluation periods 428. In other words, each sequence may have a determined time for the next evaluation period 428 in that sequence. The sequences may be combined by super-position. In general, if any of the concurrent sequences is in an evaluation period, then the system 100 may be in an evaluation period. If no sequence is in an evaluation period 428, then the system may be in an extended use period 430, using the uplink transmission configuration determined by the last evaluation period 428 (regardless of which sequence determined the uplink transmission configuration to use). When both sequences are scheduled to have an evaluation period at the same time, at an overlapping time or even at times close to one another, then the two evaluation periods 428 may be merged. This will be explained further below. The overall effect may be to achieve a single actual sequence that is generated by the super-position of multiple "hidden" sequences.

The system 100 may determine 1036 a selection of uplink transmission configurations to evaluate for each sequence. One advantage of multiple sequences of cycles, or "multi-cycle" super-position 1000, is that adaptation may be done over different dimensions separately. A first parameter may be adapted in one sequence while a second parameter is kept constant and the first parameter may be kept constant in another sequence while the second is adapted. Examples of such parameters may include the uplink transmission configuration testing period 426, evaluation period 428, extended use period 430, total cycle 432 duration, the number of uplink transmission configurations (i.e., window of phases), the resolution of phases (e.g., 90° offsets, 45° offsets, etc.), whether antenna magnitude combinations are included in the selection (of uplink transmission configurations to evaluate) for only a single sequence, etc. By doing this, key tradeoffs may be considered and accounted for in a controlled manner. The term "antenna magnitude combinations" refers to configurations in which the magnitudes of the weights are different (not merely the phases). In extreme cases, there may be only antenna switching (only one antenna or the other).

Another feature of the method 1000 is that the parameters for each sequence may be adapted based on the outcome or status of another sequence. For example, the phase determined in one sequence may be used as the center of a phase search window in another sequence. Alternatively, one sequence may narrow down a magnitude difference while the other searches for a phase difference. Alternatively, each sequence may search a different range of values (phases or magnitudes) or at different resolutions (or both). Thus, examples of parameters that may be so adapted may include window size, window center, phase resolution, duty cycle, uplink transmission configuration testing period 426, evaluation period 428 duration, extended use period 430, uplink transmission configuration subset, etc. In the following explanation, the focus is on phase difference, but the method may be generalized to magnitude or both phase and magnitude (including antenna switching).

The system 100 may evaluate 1038 a selection of uplink transmission configurations, select 1040 an uplink transmission configuration and apply 1042 it for an extended use period 430. The system 100 may also store the selected uplink transmission configuration for later use. The wireless communication device 104 may evaluate 1038 the selection of uplink transmission configurations Q(c) using power control bits or transmit power. The wireless communication device 104 may select 1040 the uplink transmission configuration in the subset Q(c) corresponding to lowest transmit power during the testing period 426. Alternatively, the wireless communication device 104 may select 1040 the uplink transmission configuration in the subset Q(c) corresponding to a particular testing period 426 based on another feedback or measured parameter such as comparing power control bits integrated over respective test periods 426 or by considering a comparative feedback from an infrastructure device such as a base station 102. Alternatively, the base station 102 may evaluate 1038 the uplink transmission configurations in subset Q(c). The base station 102 may then select 1040 the uplink transmission configuration corresponding to the testing period 426 that had the lowest mean wireless communication device 104 transmit power or the best receive signal-to-noise ratio (or other comparative measure). Alternatively, the base station 102 may select 1036 the subset Q(c) and communicate the subset to the wireless communication device 104 for evaluation 1038 and either the base station 102 or wireless communication device 104 may select 1040 the optimum uplink transmission configuration. If the base station 102 selects 1036 the subset but the wireless communication device 104 selects 1040 the optimum uplink transmission configuration, then the wireless communication device 104 may communicate the optimum uplink transmission configuration (or even the metrics) to the base station 102, which may use this to select 1036 the subset for the next cycle 432. Otherwise, if the device performing the selection 1036 and the device performing the evaluation 1038 are one and the same (or collocated), the overhead of such communication may be omitted. The system 100 may also store 1041 parameters and/or metrics for use in later evaluation. The parameters and/or metrics stored 1041 may be normalized relative metrics, raw uplink transmission configuration metrics, relative metrics, any suitable consistency metric, and/or any other data useful in computing a consistency.

The system 100 may apply 1042 the selected uplink transmission configuration for an extended use period 430. The system 100 may then return to determine 1034 when to evaluate uplink transmission configurations as a super-position of cycles.

FIG. 11 is a block diagram illustrating relative phase offsets on a unit circle. For purposes of explanation, suppose that a relative phase offset is represented on a unit circle as shown in FIG. 11. In the left circle, there are four 90° phase offsets 1176 shown, where the dotted one is the reference (which here happens to be 0 degrees). In the right circle, there are five adjacent 10 degree phase offsets 1178 centered on a 0 degree reference (denoted by the dotted arrow). As described above, the left circle may represent four 90° phase offsets 1176 that may correspond to one sequence of cycles, while the right circle may represent five 10° phase offsets 1178 that may correspond to another sequence of cycles.

Figure 12:
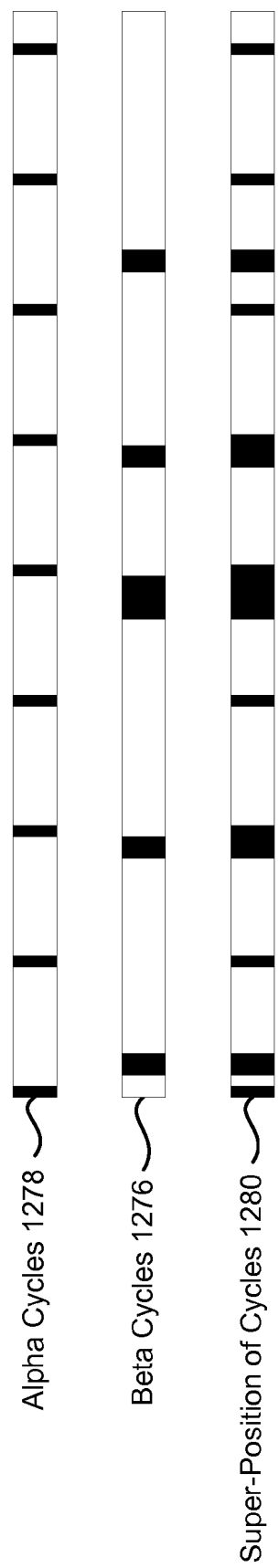
FIG. 12 is a block diagram illustrating a super-position of two sequences of cycles.

FIG. 12 is a block diagram illustrating a super-position of two sequences of cycles. Alpha cycles 1278 may be one sequence of cycles while beta cycles 1276 may be another sequence of cycles. In this example, the alpha cycles 1278 may have a fixed cycle 432 duration and fixed evaluation period 428, while the beta cycles 1276 may have an adaptive or variable cycle 432 duration and a variable evaluation period 428. The super-position of cycles 1280 may be the combination of the alpha cycle 1278 and the beta cycle 1276. The alpha cycles 1278 and/or the beta cycles 1276 may or may not have a fixed cycle 432 duration and/or evaluation period 428. The alpha cycles 1278 and/or the beta cycles 1276 may or may not have an adaptive variable cycle 432 duration and/or a variable evaluation period 428.

Figure 13:
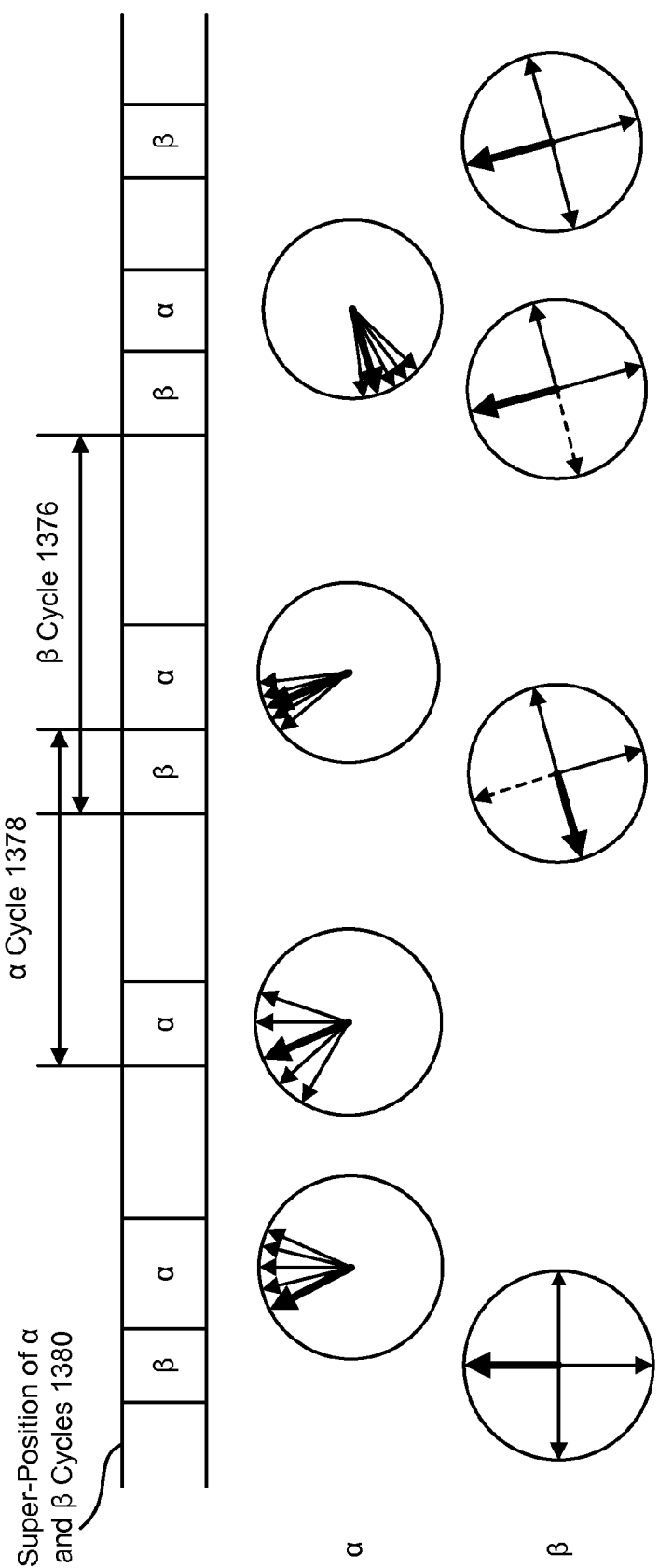
FIG. 13 is another block diagram illustrating a super-position of two sequences of cycles.

FIG. 13 is another block diagram illustrating a super-position of two sequences of cycles. For example, FIG. 13 depicts the super-position 1380 of an alpha sequence and a beta sequence in which the alpha sequence may have a finer resolution but a narrower window. The top part depicts the timeline of the super-position 1380 combination of alpha and beta sequences. Note that the evaluation periods (marked a or β) of different sequences may be merged or combined if they occur close to one another or would otherwise overlap. The time between evaluation periods 428 corresponds to the extended use periods 430. An α cycle 1378 (including the extended use period 430) may begin at the beginning of an α evaluation period 428 and may extend until the beginning of the following α cycle. A β cycle 1376 (including the extended use period 430) may begin at the beginning of a β evaluation period 428 and may extend until the beginning of the following β cycle. At the bottom of FIG. 13, the selected uplink transmission configurations at each evaluation period are illustrated using the unit circle notation for each of the sequences independently. In practice, if the evaluation periods 428 occurred within some determined time of each other, they may be merged and duplicate possible uplink transmission configurations may be eliminated from the evaluation period 428. Thus, two evaluation periods 428 may become one with a union of the subsets of uplink transmission configurations from each sequence. However, evaluation periods 428 may alternatively be concatenated, in which case it may be preferable to follow the lower resolution cycle (in this case, beta) with (or skip) the higher resolution cycle (in this case, alpha).

In FIG. 13, a dotted arrow indicates a prior best uplink transmission configuration (if different from the resulting best uplink transmission configuration) and a thick arrow indicates the best uplink transmission configuration resulting from the evaluation. In this example, the β sequence uses 90° phase offsets that may be rotated to overlap the phase of the last best uplink transmission configuration. This is not required, but may be beneficial. That is, the β sequence phases are rotated to center the uplink transmission configuration subset on the current best uplink transmission configuration (which may have just been determined by the other finer resolution a sequence). In this example, both sequences have a fixed number of uplink transmission configurations; the β cycle is fixed at four phases and the α cycle is fixed at five. In another configuration, the β cycle might also include antenna switching or magnitude combinations, in which case the α cycle may be skipped if the current best uplink transmission configuration is one of the antennas.

Another advantage of multi-cycle super-position may be that each sequence may have a different uplink transmission configuration testing period 426 duration. Thus, the reliability of test may be adjusted per sequence. For example, a sequence optimized for tracking fast changes in channel conditions may test uplink transmission configurations for short times, while a concurrent sequence optimized for tracking long-term channel conditions may test uplink transmission configurations for longer times to average out short-term fluctuations. Alternatively, the uplink transmission configuration testing period 426 duration or evaluation period 428 duration of one sequence's cycles 432 may be set based on the other cycle's durations (such as scaled by a fixed or adapted factor). For example, a slower sequence may have larger uplink transmission configuration testing period 426 durations and a faster sequence may have smaller uplink transmission configuration testing period 426 durations and the relation between the two may be a fixed scaling based on the difference in their actual or nominal duty cycles (i.e., how much slower/faster their cycles are).

Another advantage of multi-cycle super-position may be that each sequence may have a different cycle rate. Thus, the cost of testing many possible uplink transmission configurations may be offset by infrequent testing, yet performance gain may be sought by testing a subset of those uplink transmission configurations more frequently. For example, the cycle rate of one sequence may be adapted (variable) while another is fixed (absolutely or relative to the other). A first sequence (beta) might operate at a slower rate and include all 90° phase offsets and a second cycle (alpha) might operate at a faster rate, but include 45° phase offsets in a window around the current leading uplink transmission configuration. For example, the beta cycle may have an adaptive duration with a pre-determined minimum. The alpha cycle may be configured to go faster (e.g., have a shorter duration, an equal duration to the beta minimum or to the beta minimum that is adapted relative to the beta cycle (e.g., ⅕th of the current beta cycle)).

The two cycles may overlap such that if any is in an evaluation period, that cycle may control which uplink transmission configuration is applied during the evaluation and in the subsequent evaluation period 428. If two evaluation periods overlap, they may be merged (e.g., only one uplink transmission configuration may be applied at one time, but the set of uplink transmission configurations evaluated may be the union of the subsets for each cycle).

Another advantage of multi-cycle super-position may be that each sequence may have a different resolution. In particular, one may be fixed and another may be adapted. For example, suppose the alpha sequence has an adaptable resolution $\Delta\phi(j)$ (e.g., in degrees) but has a limited number of uplink transmission configurations $|Q_\alpha(j)|=|Q_\alpha|$ (for the alpha sequence) that may be tested in order to be able to track a dynamically changing channel. The alpha sequence evaluation search window may thus be limited to phases centered around the current best phase as shown in Equation (19):

$$W_\alpha = \left[\frac{1-|Q_\alpha|}{2}, \frac{|Q_\alpha|-1}{2}\right] \quad (19)$$

in units of $\Delta\phi(j)$. Alternatively, $W_\alpha$ may vary over cycles (i.e., $W_\alpha(j)$ where j is an alpha sequence cycle index). However, assume that $W_\alpha$ is constant for purposes of explanation. For example, suppose $|Q_\alpha|=5$ and the best uplink transmission configuration is currently 45° phase and the resolution is currently $\Delta\phi(j)=10$ degrees, then $W_\alpha=[-2, +2]$ and so $Q_\alpha(j)$ would be the set of uplink transmission configurations corresponding to the following phase angles: $\{25, 35, 45, 55, 65\}$ (in degrees).

One approach to adapting the resolution may be to set the resolution depending on the cycle duration to tradeoff the cost of testing with longer extended use periods. In other words, the number of uplink transmission configurations may be increased, for example, by increasing the resolution and retaining the window size, as the cycle duration increases (and vice versa).

Another approach to adapting the resolution may be to determine the optimal resolution to detect change in phase. One way may be to use the cross-correlation between uplink transmission configurations (different phases) to determine how quickly the phase is changing across cycles 432. The cross-correlation may be given by Equation (20):

$$r^x(\Delta w, j, a) = \frac{1}{|W_\alpha(j)|} \sum_{i \in W_\alpha(j)} m(h_{i\Delta\phi'(j)+\phi'(j)}, j) m(h_{(i+\Delta w)\Delta\phi'(j)+\phi'(j)}, j-a) \quad (20)$$

where m(h, j) is the metric (preferably the normalized relative metric) of uplink transmission configuration h for cycle j, where $h_x$ is the uplink transmission configuration having phase x and $\Delta\phi'(j)$ is a normalized resolution (i.e., a normalized version of $\Delta\phi(j)$) in case the resolution is changing across cycles. In basic form, the cross-correlation refers to the correlation between the pairs (combinations) of metrics of two uplink transmission configurations that have a given phase difference. The phase difference that gives the highest correlation between paired metrics reflects a likely change in phase over cycles. That is, $\Delta\phi'(j)=\min(\{\Delta\phi(x)|j-\tau\le x\le j\})$ and the uplink transmission configuration metrics may be interpolated if the resolution at the given cycle was lower than the cross-correlation calls for. In an extended form, the cross-correlation also may be averaged over a time window. The value $\tau$ is the cross-correlation time window, or, if it is effectively the entire time, $\Delta\phi'(j)$ may be simply fixed to the minimum possible resolution. This definition is merely an example. For example, this cross-correlation may be filtered over time. Other definitions of cross-correlation or alternative parameters may be used as long as the parameter reflects the correlation between the metric of phase offsets over time. For example, if the best phase changes at a rate of 10°, then the cross-correlation for a phase offset of $\Delta w=10$ degrees will be high. Thus, the target phase resolution may be selected according to the phase offset that best corresponds to the likely offset of the best phase in the next cycle, as shown in Equation (21):

$$\Delta\hat{\phi}(j)=\Delta\phi'(j)\text{argmax}_{\Delta w}(r^x(\Delta w, j, a)) \quad (21)$$

That is, where the phase resolution is the phase offset that gives the maximum cross-correlation, or, with a filter on the parameter (cross-correlation), or as shown in Equation (22) where the $\text{argmax}_x(y(x))$ operator yields the argument value of x that yields the maximum value of the expression y(x):

$$\Delta\hat{\phi}(j)=\Delta\phi'(j)\text{argmax}_{\Delta w}(f(\{r^x(\Delta w, x, a)|j-\tau\le x\le j\})) \quad (22)$$

or, with oversampling (higher resolution) as shown in Equation (23):

$$\Delta\hat{\phi}(j) = \frac{\Delta\phi'(j)}{k} \quad (23)$$

where $\tau$ is the cross-correlation time window over which the filter f is applied to the parameter $r^x$ (e.g., cross correlation). The parameter k is the oversampling. For example, k=2 would set the resolution to twice that likely used to narrow in on the best phase in the next cycle 432.

Another approach to adapting the phase resolution may be to use the time derivative of the best phase. The best phase is a discrete time variable, so its derivative is as shown in Equation (24):

$$\frac{\delta\phi(j)}{\delta t(j)} = \frac{\phi*(j)-\phi*(j-1)}{t(j)-t(j-1)} \quad (24)$$

where $\phi*(j)$ is the phase of the best uplink transmission configuration in cycle j and t(j) is the time of evaluation of the uplink transmission configuration for cycle j. This may be simplified to a constant δt(j)=t(j)−t(j−1), particularly if the cycle for the sequence is constant or constant over some time frame.

The resolution may then be selected as follows for a fixed time interval as shown in Equation (25):

$$\Delta\hat{\phi}(j)=\delta\phi(j) \quad (25)$$

and, for a changing time interval as shown in Equation (26):

$$\Delta\hat{\phi}(j) = \frac{\delta\phi(j)}{\delta t(j)}\Delta t(j) \quad (26)$$

where Δt(j) is the next time interval, i.e., Δt(j)=t(j+1)−t(j). This value may be oversampled as above, and since the derivative may not be an integer, the value can be rounded or adjusted to the next smallest or largest value as shown in Equation (27):

$$\Delta\hat{\phi}(j) = \frac{\Delta\phi_{min}}{k}\text{ceil}\left(\frac{1}{\Delta\phi_{min}}\left(\frac{\delta\phi(j)}{\delta t(j)}\right)\right) \quad (27)$$

where the ceil operator rounds the argument up, and where $\Delta\phi_{min}$ may be the search resolution, the normalized search resolution ($\Delta\phi'(j)$) or a minimum search resolution, for example. The parameter k controls oversampling. For example, k=2 may set the resolution to twice that likely used to narrow in on the best phase in the next cycle. Also, the derivative may be filtered, such as with an IIR filter before computing the target phase resolution $\Delta\hat{\phi}(j)$, or in general, as shown in Equation (28):

$$\Delta\hat{\phi}(j) = \frac{\Delta\phi_{min}}{k}\text{ceil}\left(\frac{1}{\Delta\phi_{min}}f\left(\left\{\frac{\delta\phi(j)}{\delta t(j)}\,\middle|\, j-\tau \leq x \leq j\right\}\right)\right) \quad (28)$$

where f is the IIR filter. Alternatively, the value $\Delta\hat{\phi}(j)$ itself may be filtered. The above description is one example of applying the method. Various alternatives may be used in keeping with the same principles.

Consider the following example. Suppose a beta sequence uses a predetermined subset of uplink transmission configurations (four 90° phase differences between two antennas: 0°, 90°, 180°, 270° plus two single antenna uplink transmission configurations). Suppose an alpha sequence has a variable resolution as low as 22.5° with a fixed window size of 3 uplink transmission configurations. Suppose further that the ideal uplink transmission configurations from the superposition of evaluations over time are as follows {0°, 45°, 90°, 135°, 180°, 225°, 270°, 315°, 0°, . . . } and so on (changing by 45° at each cycle). However, if only the beta cycle is used, every second cycle would use a non-optimal phase, for example: {0°, 0°, 90°, 90°, 180°, 180°, 270°, 270°, 0°, . . . }. If the alpha cycle was used at its highest resolution, it would be too slow to keep up with the change: {0°, 22.5°, 45°, 67.5°, 90°, . . . }. If the alpha cycle was used at the lowest resolution (90°)°, it would be no better than the beta cycle. The best case is if the alpha cycle uses a 45° resolution. By applying the method above, the problem may be solved. Consider the superposition of beta and alpha cycles. The prior resolution of the alpha cycle may not be critical because the beta cycle can make up for a non-optimal prior alpha cycle resolution. Say, for example, the alpha sequence is twice as fast as the beta so every odd cycle is a superposition of both evaluations and every even cycle is only an alpha evaluation. Suppose, for example that the alpha resolution is 22.5°. The result may thus be the non-optimal: {0°, 22.5°, 90°, 115.5°, 180°, 205.5°, 270°, 295.5°, 0°, . . . }. Notice that the mean difference (derivative) of these is 45° and, the most common differences (modes) are 22.5° and 67.5°. Thus the cross-correlation for these differences is the highest. Filtered or averaged, the best cross-correlation is for 45°. In other words, there may be a high cross-correlation between +45° offsets over a cycle. Thus, a target resolution should be set to 45° rather than 22.5° because otherwise the 45° degree change cannot be detected well in one cycle with a 3 uplink transmission configuration window. Now, once the target phase resolution has been determined ($\Delta\hat{\phi}(j)$ or $\Delta\phi'(j)$)=45°, this value may be used to determine the subset of possible uplink transmission configurations to be examined using the window $W_\alpha$. For example, if a 45° target phase resolution is determined with a window size of 3, $Q_\alpha(j)$ would be the set of uplink transmission configurations corresponding to the following phase angles: {−45°, 0°, +45°} added to the window center. So, for example, if the best current uplink transmission configuration corresponds to a 90° phase difference between antennas, the phase differences in the window for the alpha cycle would be {−45°, 0°, +45°}. Now, the super-position of sequences may be well aligned to the channel (which is changing at 45° per cycle).

The table below summarizes a configuration for a two-sequence super-position method.

|  | Alpha Sequence | | Beta Sequence | |
| --- | --- | --- | --- | --- |
|  | Feature | Adaptive | Feature | Adaptive |
| Resolution | High | Yes (optional dependent) | Low | No (optional adaptive) |
| Window | Narrow (Limited) | Yes (optional fixed) | Wide | No (optional adaptive) |
| Cycle | Periodic | No (or optional dependent) | Periodic | Yes (optional mode) |

Several adaptive features are exhibited in the table. For explanation, options are shown for some parameters, but in general may be used on any parameter.

First, the resolution of the alpha cycle may be optionally dependent on the beta sequence. One approach may be to disable the cycle if the performance does not meet a criterion (such as if the auto-correlation of the best uplink transmission configuration found in the sequence's evaluations is below the optimal for the cycle duration). Alternatively, phase derivative or cross-correlation approaches may be used to determine the resolution. Alternatively, the alpha sequence may be blocked or disabled if the beta sequence selects an antenna magnitude difference uplink transmission configuration rather than an antenna phase difference uplink transmission configuration. Such options may apply to the beta sequence as well. For example, the beta sequence may be disabled if the alpha cycle has already covered (already includes all or most of) the beta cycle uplink transmission configurations.

Second, the cycle duration of one sequence may be derived from the other. For example, the alpha cycle may be a predetermined fraction of the current beta cycle where the beta cycle is adapted. In such a case, the alpha cycle may be limited by a minimum duration. The uplink transmission configuration periods in each sequence may also be fixed or dependent on one another. For example, alpha uplink transmission configuration periods may be much shorter than beta cycle periods or scaled as a function of beta cycle uplink transmission configuration period duration.

Third, different modes may be used in which different cycles are active. For example, in an active mode, both alpha and beta cycles may be contributing to the super-position. In a passive mode, only one sequence (e.g., beta sequence) may be contributing to the super-position.

Figure 14:
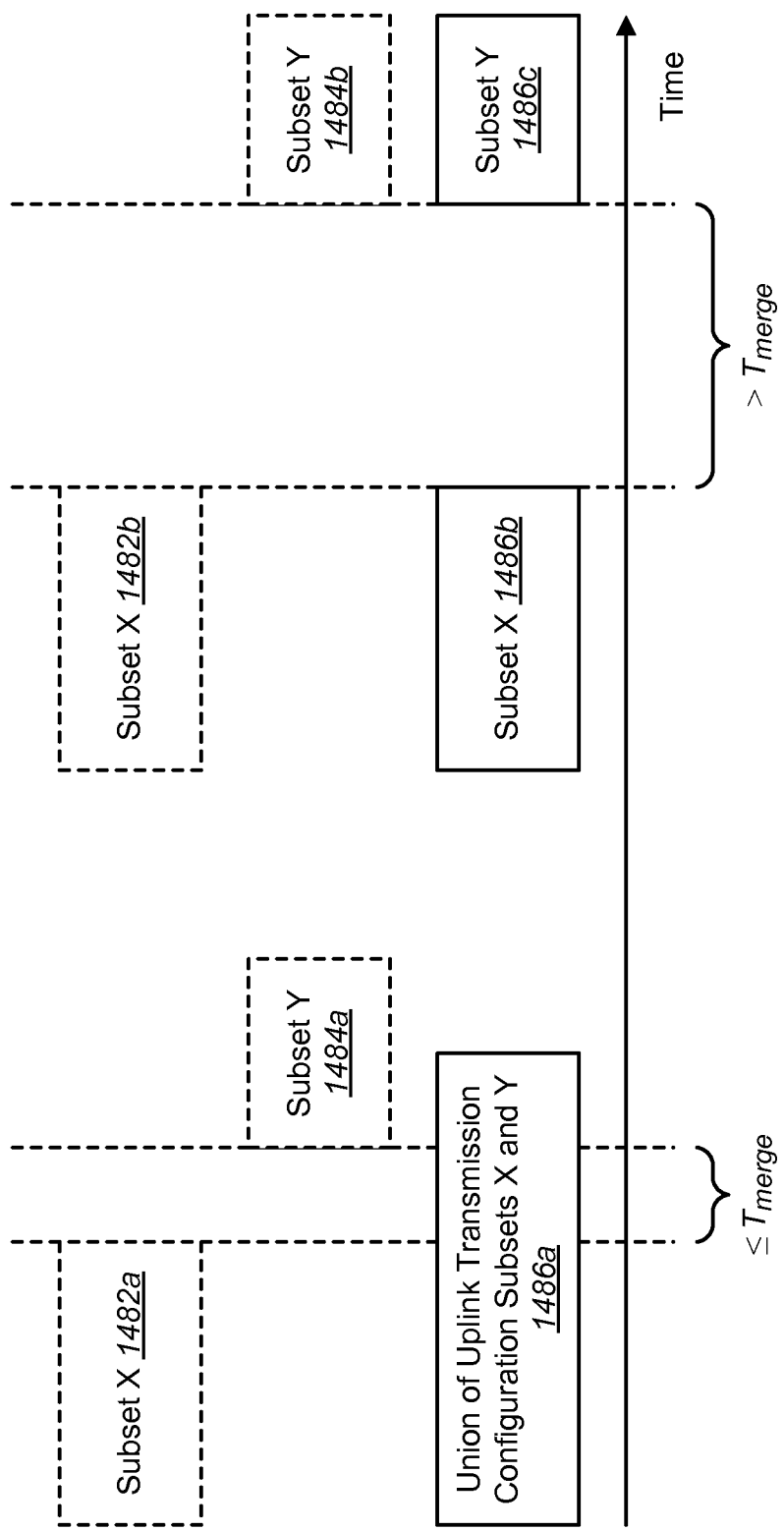
FIG. 14 is a block diagram illustrating one approach to merging subsets of possible uplink transmission configurations.

FIG. 14 is a block diagram illustrating one approach to merging subsets of possible uplink transmission configurations. As described above, if two (or more) sequences have evaluations scheduled at the same time or an overlapping time, they may be merged (i.e., select the union of uplink transmission configuration subsets), concatenated (i.e., move one to follow the other) or one or more may be omitted (skipped, e.g., the lower resolution sequence cycle may be skipped). In one beneficial approach, the union is taken. Furthermore, it may also be beneficial to merge cycles even if the do not overlap but if they would start within a determined time from one another. Mathematically, the cycles may be merged if they satisfy the condition shown in Equation (29):

$$|t_\alpha - t_\beta| \leq T_{merge} \qquad (29)$$

where $t_\alpha$ is the start time of the alpha cycle evaluation period, $t_\beta$ is the start time of the beta cycle evaluation period and $T_{merge}$ is the threshold. The threshold may account for the duration of the evaluation. Alternatively, the begin time of the later evaluation and the start time of the earlier time could be used. In other words, the threshold or the times should account for the extended use period that may otherwise occur between the two. One objective is to merge, unless the extended use period that will result in between the two cycles' evaluation periods (if they were not merged) would be large enough to be worthwhile. Otherwise, if the evaluation period 428 would be short, there may be little benefit to having the evaluations so close together and they might as well be merged. FIG. 14 shows examples of both: on the left side, the evaluations of a subset X 1482a of possible uplink transmission configurations are merged with a subset Y 1484a of possible uplink transmission configurations, because otherwise the extended use period in between would be small (i.e., $\leq T_{merge}$). The subset X 1482a and the subset Y 1484a may thus be merged into the union of uplink transmission configuration subsets X and Y 1486a. On the right side, subset X 1482b and subset Y 1484b are not merged (i.e., subset X 1486b and subset Y 1486c remain separate) because the extended use period 430 in between is significant (i.e., $> T_{merge}$).

When a merge occurs, the union of the uplink transmission configuration subsets 1486a from each contributing sequence may be taken. This may eliminate redundant uplink transmission configurations. However, this does not restrict an uplink transmission configuration from being tested more than once in an evaluation. For example, other methods may be used to evaluate uplink transmission configurations relatively and may apply weights for the same uplink transmission configuration more than once to resolve ambiguity in a comparison. The merge operation reflects that the comparison (and any ambiguity resolution) may not need to be done multiple times.

Figure 15:
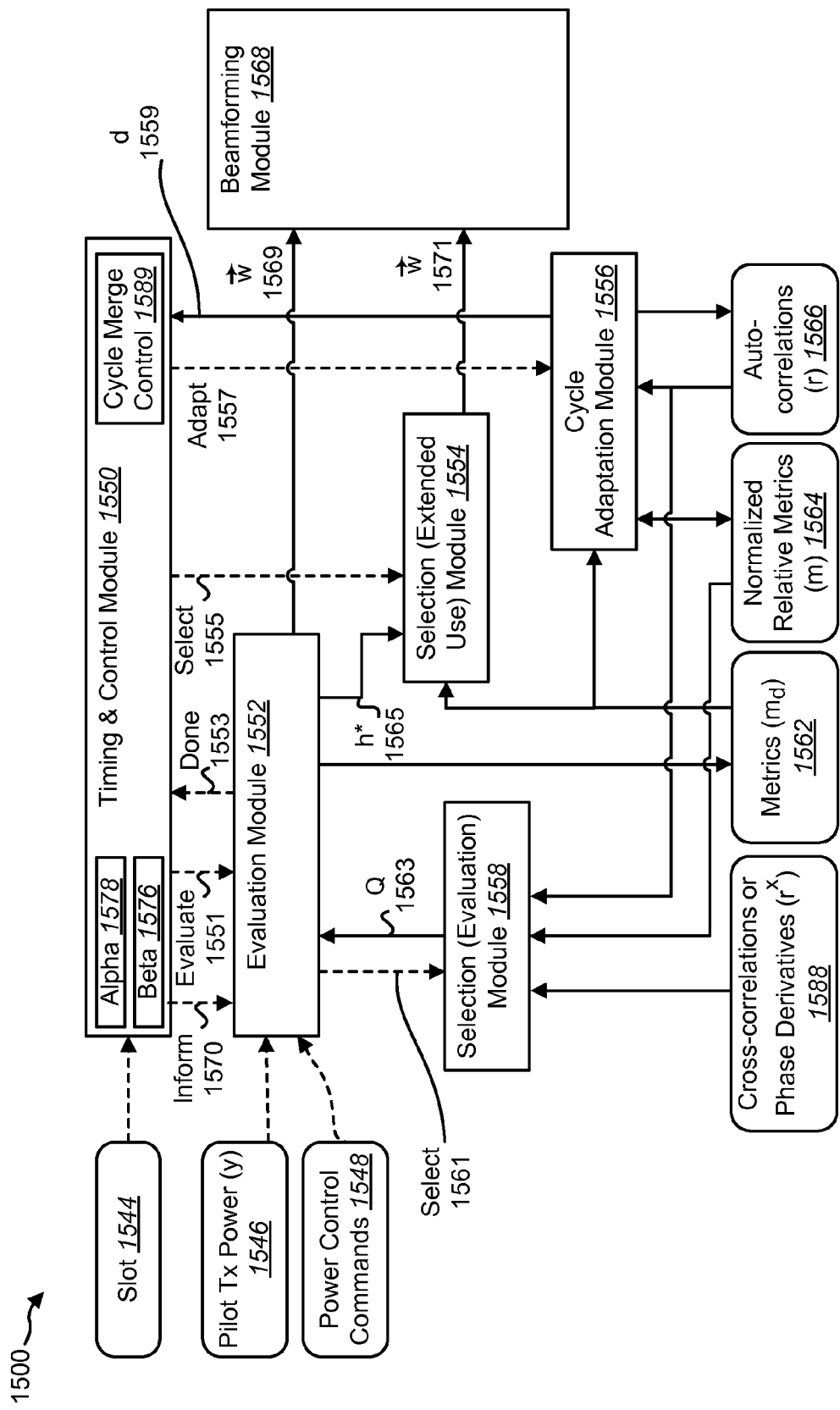
FIG. 15 is a block diagram illustrating data flows for uplink transmit diversity enhancement.

FIG. 15 is a block diagram illustrating data flows 1500 for uplink transmit diversity enhancement. In particular, FIG. 15 illustrates data flows that may be used in a multi-cycle super-position method. An evaluation module 1552 may receive the pilot transmission power (y) 1546 and power control commands 1548. The timing and control block 1550 may keep track of the alpha 1578 and beta 1576 schedules and may merge 1589 them if they would occur close together. The timing and control module 1550 may inform 1570 the evaluation module 1552 which cycle (or both) the evaluation corresponds to. In response to an evaluation request 1551 from a timing and control module 1550, the evaluation module 1552 may request 1561 the selection of potential uplink transmission configurations from a selection (evaluation) module 1558. The selection (evaluation) module 1558 may provide two or more potential uplink transmission configurations Q 1563 to the evaluation module 1552, where Q 1563 represents a subset of possible uplink transmission configurations.

The evaluation module 1552 may then evaluate the two or more potential uplink transmission configurations. The evaluation module 1552 may apply each potential uplink transmission configuration to a beamforming module 1568. As discussed above, each uplink transmission configuration may include phase configurations and antenna configurations. The phase configurations and antenna configurations may be sent to the beamforming module as a collective weight $\vec{w}$ 1569. The beamforming module 1568 may then send uplink transmissions using the applied uplink transmission configurations. Metrics ($m_d$) 1562 of the evaluation may be stored. The evaluation module 1552 may indicate to the timing and control module 1550 when the evaluation is done 1553.

The timing and control module 1550 may send a select request 1555 to a selection (extended use) module 1554. The selection (extended use) 1554 module may select an uplink transmission configuration 1565 from the potential uplink transmission configurations. The selection (extended use) module 1554 may base the selection on the stored metrics ($m_d$) 1562. The evaluation module 1552 may provide the uplink transmission configuration h* 1565 to the selection (extended use) module 1554. Alternatively, the evaluation module 1552 may provide only the metrics which the selection (extended use) module 1554 may use to determine to the uplink transmission configuration 1565.

The selection (extended use) module 1554 may apply the uplink transmission configuration to the beamforming module 1568 using a weight $\vec{w}$ 1571. The weight options may not necessarily include the magnitude differences between antennas. For example, the options may include a set of four 90 degree phase differences with equal magnitude and two antenna switching options. Alternatively, the options may include only antenna switching, phases or combinations of magnitude, phase and switching. The beamforming module 1568 may then send uplink transmissions using the applied uplink transmission configuration.

The timing and control module 1550 may send a request to a cycle adaptation module 1556 to adapt 1557 cycle adaptation parameters. The cycle adaptation module 1556 may use the stored metrics ($m_d$) 1562 and calculated normalized relative metrics (m) 1564 to obtain autocorrelations (r) 1566 for each uplink transmission configuration over time. The cycle adaptation module 1556 may then use the stored metrics ($m_d$) 1562, the calculated normalized relative metrics (m) 1564, and the autocorrelations (r) 1566 to determine an evaluation rate d 1559. The cycle adaptation module 1556 may send the evaluation rate d 1559 to the timing and control module 1550. The evaluation rate d 1559 may then be used by the timing and control module 1550 for future uplink transmission configuration enhancement for future slots 1544.

A selection (evaluation) module 1558 may use autocorrelations (r) 1566, normalized relative metrics (m) 1564, and/or cross-correlations or phase derivatives ($r^x$) 1588 in order to select a subset of possible uplink transmission configurations. Either the cross-correlations or derivatives ($r^x$) 1588 may be used to determine the resolution for the alpha phase while the beta phase may use a fixed uplink transmission configuration subset. The selection (evaluation) module 1558 is distinct from the selection (extended use) module 1554, which may select which uplink transmission configuration to use 424 for an extended period 430. However, the auto-correlations (r) 1566 may be used by both a cycle length adaptation module 1556 and the uplink transmission configuration selection module 1558. This method may be used regardless of what evaluation method is used to actually compare uplink transmission configurations (such as absolute or relative evaluation) or how they are compared (e.g., using power control bits 1548, transmit power level 1546, etc.).

Cycles may be independent or dependent upon one another. For example, one cycle's uplink transmission configuration subset, resolution, window size, duty cycle, etc. may be determined based on the outcome of the other's evaluations or the others parameters, such as duty cycle, phase resolution, window size, window center, uplink transmission configuration testing period, evaluation duration, extended use period, total cycle duration, number of uplink transmission configurations, whether antenna magnitude combinations are included, uplink transmission configuration subset, etc. In other words, they may be adaptively complimentary to one another. For example, an alpha cycle may be used to zoom in on phases at higher resolution close to the best low-resolution phase found by a beta cycle. Or, an alpha cycle may be used for more frequent evaluation of some of the top (best) uplink transmission configurations found recently by a slower beta cycle. Or, one cycle may be used for antenna/magnitude uplink transmission configurations while another is used for phase difference uplink transmission configurations. Other variations will be apparent to one skilled in the art.

Figure 16:
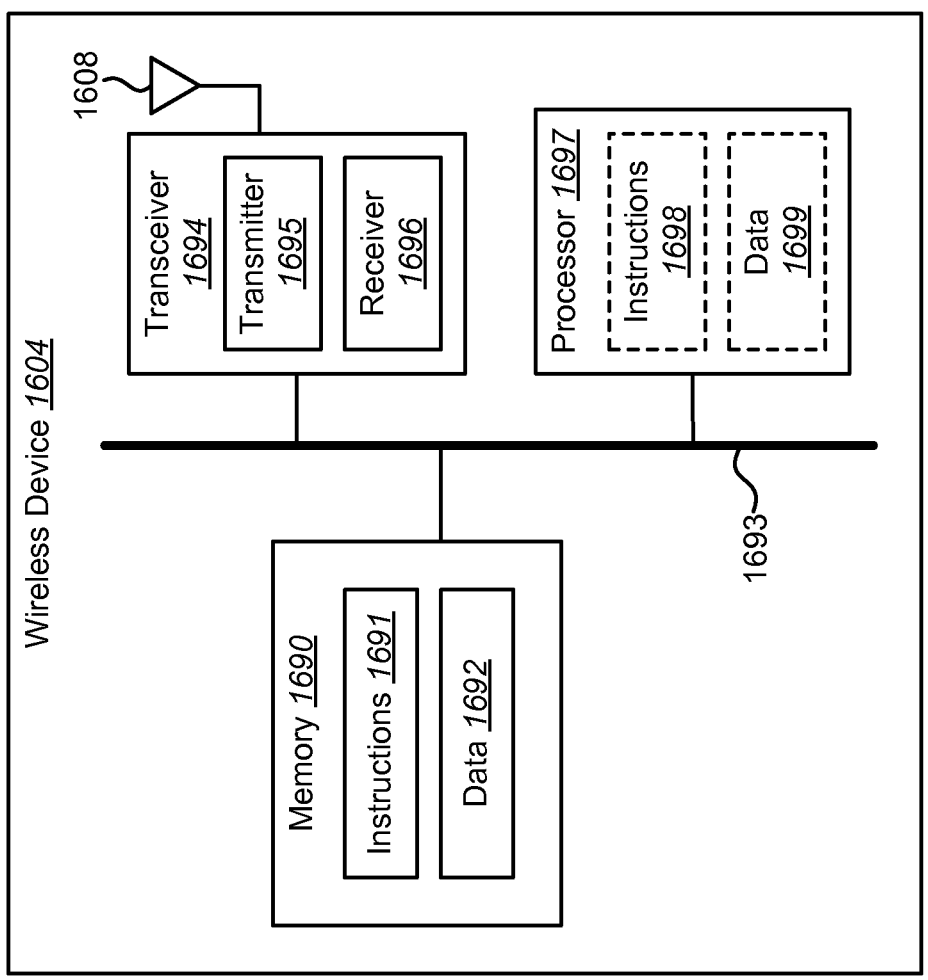
FIG. 16 is a block diagram illustrating certain components that may be included within a wireless device.

FIG. 16 is a block diagram illustrating certain components that may be included within a wireless device 1604. The wireless device 1604 may be a wireless communication device 104.

The wireless device 1604 includes a processor 1697. The processor 1697 may be a general purpose single- or multi-chip microprocessor (e.g., an ARM), a special purpose microprocessor (e.g., a digital signal processor (DSP)), a microcontroller, a programmable gate array, etc. The processor 1697 may be referred to as a central processing unit (CPU). Although just a single processor 1697 is shown in the wireless device 1697 of FIG. 16, in an alternative configuration, a combination of processors (e.g., an ARM and DSP) could be used.

The wireless device 1604 also includes memory 1690. The memory 1690 may be any electronic component capable of storing electronic information. The memory 1690 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1692 and instructions 1691 may be stored in the memory 1690. The instructions 1691 may be executable by the processor 1697 to implement the methods disclosed herein. Executing the instructions 1691 may involve the use of the data 1692 that is stored in the memory 1690. When the processor 1697 executes the instructions 1691, various portions of the instructions 1698 may be loaded onto the processor 1697, and various pieces of data 1699 may be loaded onto the processor 1697.

The wireless device 1604 may also include a transmitter 1695 and a receiver 1696 to allow transmission and reception of signals to and from the wireless device 1604. The transmitter 1695 and receiver 1696 may be collectively referred to as a transceiver 1694. An antenna 1608 may be electrically coupled to the transceiver 1694. The wireless device 1604 may also include (not shown) multiple transmitters, multiple receivers, multiple transceivers and/or multiple antenna.

The various components of the wireless device 1604 may be coupled together by one or more buses, which may include a power bus, a control signal bus, a status signal bus, a data bus, etc. For the sake of clarity, the various buses are illustrated in FIG. 16 as a bus system 1693.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is used for proper operation of the method that is being described, the order and/or use of specific steps and/or actions may be modified without departing from the scope of the claims.

Further, it should be appreciated that modules and/or other appropriate means for performing the methods and techniques described herein can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for uplink transmit diversity in a wireless communication device, the method comprising:
    selecting a subset of uplink transmission configurations from a set of uplink transmission configurations based on a consistency condition if a corresponding consistency metric satisfies a threshold, wherein the consistency condition comprises a past performance of each uplink transmission configuration, and wherein the threshold is selected to optimize a tradeoff between a cost of evaluation and a benefit of extended use;
    evaluating each one of the selected subset of uplink transmission configurations;
    selecting an uplink transmission configuration from the subset of uplink transmission configurations based on the evaluation; and
    applying the selected uplink transmission configuration for an extended use period.

2. The method of claim 1, wherein evaluating each one of the selected subset of uplink transmission configurations is done relative to another uplink transmission configuration.

3. The method of claim 1, wherein the consistency metric is an auto-correlation of a metric of the uplink transmission configuration.

4. The method of claim 3, wherein the metric of the uplink transmission configuration is a normalized relative metric that is based on a comparison of a mean transmit power corresponding to the uplink transmission configuration and a mean transmit power for all uplink transmission configurations tested in an evaluation period.

5. The method of claim 3, wherein the auto-correlation is determined using an Infinite Impulse Response (IIR) filter.

6. The method of claim 1, wherein the consistency metric is based on uplink transmission configuration cross-correlations.

7. The method of claim 1, wherein the consistency metric is based on a best phase derivative.

8. The method of claim 1, wherein the selecting of the subset of uplink transmission configurations from the set of uplink transmission configurations is also based on an age condition.

9. The method of claim 8, wherein the selecting of the subset of uplink transmission configurations comprises selecting uplink transmission configurations that are older than an age threshold.

10. The method of claim 9, wherein the age threshold is determined based on a tradeoff point between a cost of evaluation of a larger subset of uplink transmission configurations and a benefit of detecting a better uplink transmission configuration not in a subset of uplink transmission configurations selected based on a correlated metric.

11. The method of claim 10, wherein the tradeoff point is based on a duty cycle.

12. The method of claim 11, wherein the duty cycle is an evaluation period duration divided by a total cycle duration.

13. The method of claim 11, wherein the duty cycle is an evaluation period duration divided by an extended use period.

14. The method of claim 9, wherein the age threshold is defined as a number of slots since a corresponding uplink transmission configuration was tested.

15. The method of claim 9, wherein the age threshold is defined as a number of cycles.

16. The method of claim 1, wherein the selecting of the subset of uplink transmission configurations further comprises limiting the subset to a maximum number of uplink transmission configurations with a high consistency.

17. The method of claim 1, further comprising storing metrics.

18. A wireless device configured for uplink transmit diversity, comprising:
    a processor;
    memory in electronic communication with the processor;
    instructions stored in the memory, the instructions being executable by the processor to:
        select a subset of potential uplink transmission configurations from a set of uplink transmission configurations based on a consistency condition if a corresponding consistency metric satisfies a threshold, wherein the consistency condition comprises a past performance of each uplink transmission configuration, and wherein the threshold is selected to optimize a tradeoff between a cost of evaluation and a benefit of extended use;

evaluate each one of the selected subset of potential uplink transmission configurations;

select an uplink transmission configuration from the selected subset of potential uplink transmission configurations based on the evaluation; and apply the selected uplink transmission configuration for an extended use period.

19. The wireless device of claim 18, wherein evaluating each one of the selected subset of potential uplink transmission configurations is done relative to another uplink transmission configuration.

20. The wireless device of claim 18, wherein the consistency metric is an auto-correlation of a metric of the uplink transmission configuration.

21. The wireless device of claim 20, wherein the metric of the uplink transmission configuration is a normalized relative metric that is based on a comparison of a mean transmit power corresponding to the uplink transmission configuration and a mean transmit power for all uplink transmission configurations tested in an evaluation period.

22. The wireless device of claim 20, wherein the auto-correlation is determined using an Infinite Impulse Response (IIR) filter.

23. The wireless device of claim 18, wherein the consistency metric is based on uplink transmission configuration cross-correlations.

24. The wireless device of claim 18, wherein the consistency metric is based on a best phase derivative.

25. The wireless device of claim 18, wherein the instructions being executable by the processor to select the subset of uplink transmission configurations from the set of uplink transmission configurations is also based on an age condition.

26. The wireless device of claim 25, wherein the instructions executable to select the subset of uplink transmission configurations comprise instructions executable to select uplink transmission configurations that are older than an age threshold.

27. The wireless device of claim 26, wherein the age threshold is determined based on a tradeoff point between a cost of evaluation of a larger subset of uplink transmission configurations and a benefit of detecting a better uplink transmission configuration not in a subset of uplink transmission configurations selected based on a correlated metric.

28. The wireless device of claim 27, wherein the tradeoff point is based on a duty cycle.

29. The wireless device of claim 28, wherein the duty cycle is an evaluation period duration divided by a total cycle duration.

30. The wireless device of claim 28, wherein the duty cycle is an evaluation period duration divided by an extended use period.

31. The wireless device of claim 26, wherein the age threshold is defined as a number of slots since a corresponding uplink transmission configuration was tested.

32. The wireless device of claim 26, wherein the age threshold is defined as a number of cycles.

33. The wireless device of claim 18, wherein the instructions executable to select the subset of potential uplink transmission configurations further comprise instructions executable to limit the subset to a maximum number of uplink transmission configurations with a high consistency.

34. A wireless device configured for uplink transmit diversity, comprising:

means for selecting a subset of potential uplink transmission configurations from a set of uplink transmission configurations based on a consistency condition if a corresponding consistency metric satisfies a threshold, wherein the consistency condition comprises a past performance of each uplink transmission configuration, and wherein the threshold is selected to optimize a tradeoff between a cost of evaluation and a benefit of extended use;

means for evaluating each one of the selected subset of potential uplink transmission configurations;

means for selecting an uplink transmission configuration from the selected subset of potential uplink transmission configurations based on the evaluation; and means for applying the selected uplink transmission configuration for an extended use period.

35. A computer-program product for uplink transmit diversity, the computer-program product comprising a non-transitory computer-readable medium having instructions thereon, the instructions comprising:

code for selecting a subset of potential uplink transmission configurations from a set of uplink transmission configurations based on a consistency condition if a corresponding consistency metric satisfies a threshold, wherein the consistency condition comprises a past performance of each uplink transmission configuration, and wherein the threshold is selected to optimize a tradeoff between a cost of evaluation and a benefit of extended use;

code for evaluating each one of the selected subset of potential uplink transmission configurations;

code for selecting an uplink transmission configuration from the selected subset of potential uplink transmission configurations based on the evaluation; and code for applying the selected uplink transmission configuration for an extended use period.

* * * * *